(12) United States Patent
Liao et al.

(10) Patent No.: US 11,697,260 B2
(45) Date of Patent: Jul. 11, 2023

(54) METHODS FOR TREATING INNER LINERS, INNER LINERS RESULTING THEREFROM AND TIRES CONTAINING SUCH INNER LINERS

(71) Applicant: Bridgestone Americas Tire Operations, LLC, Nashville, TN (US)

(72) Inventors: Kung-Ching Liao, Copley, OH (US); Jared J. Griebel, Orange Village, OH (US); Brian S. Alexander, Westfield, IN (US); Bradley S. Plotner, Akron, OH (US); Ross W. Widenor, Munroe Falls, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1211 days.

(21) Appl. No.: 16/310,660

(22) PCT Filed: Jun. 29, 2017

(86) PCT No.: PCT/US2017/040024
§ 371 (c)(1),
(2) Date: Dec. 17, 2018

(87) PCT Pub. No.: WO2018/005810
PCT Pub. Date: Jan. 4, 2018

(65) Prior Publication Data
US 2019/0176422 A1    Jun. 13, 2019

Related U.S. Application Data

(60) Provisional application No. 62/357,009, filed on Jun. 30, 2016.

(51) Int. Cl.
*B29D 30/06* (2006.01)
*B29D 30/00* (2006.01)
*C08J 7/04* (2020.01)
*C08J 7/043* (2020.01)
*B60C 5/14* (2006.01)
*B60C 1/00* (2006.01)

(52) U.S. Cl.
CPC ......... *B29D 30/0681* (2013.01); *B29D 30/00* (2013.01); *B29D 30/06* (2013.01); *B60C 1/0008* (2013.01); *B60C 5/14* (2013.01); *C08J 7/043* (2020.01); *C08J 7/0427* (2020.01); *B29D 2030/0682* (2013.01); *C08J 2309/00* (2013.01); *C08J 2315/02* (2013.01); *C08J 2407/00* (2013.01); *C08J 2409/00* (2013.01); *C08J 2415/02* (2013.01); *C08J 2475/04* (2013.01)

(58) Field of Classification Search
None
See application file for complete search history.

(56) References Cited

U.S. PATENT DOCUMENTS

| | | |
|---|---|---|
| 2,320,716 A | 6/1943 | Corkery et al. |
| 4,113,401 A | 9/1978 | McDonald |
| 4,113,799 A | 9/1978 | Van Ornum et al. |
| 4,116,895 A | 9/1978 | Kageyama et al. |
| 4,359,078 A | 11/1982 | Egan |
| 4,443,279 A | 4/1984 | Sandstrom |
| 4,607,065 A | 8/1986 | Kitamura et al. |
| 4,657,958 A | 4/1987 | Fieldhouse et al. |
| 4,707,526 A | 11/1987 | Sasaki et al. |
| 4,732,925 A | 3/1988 | Davis |
| 4,778,852 A | 10/1988 | Futamura |
| 4,810,565 A | 3/1989 | Wasitis et al. |
| 4,816,101 A | 3/1989 | Hong et al. |
| 4,913,209 A | 4/1990 | Hong et al. |
| 4,915,856 A | 4/1990 | Jamison |
| 4,971,831 A | 11/1990 | Ohba et al. |
| 5,085,942 A | 2/1992 | Hong et al. |
| 5,242,727 A | 9/1993 | Briddell et al. |
| 5,276,258 A | 1/1994 | Knobloch et al. |
| 5,389,715 A | 2/1995 | Davis et al. |
| 5,426,147 A | 6/1995 | Laube et al. |
| 5,556,636 A | 9/1996 | Yano et al. |
| 5,738,813 A | 4/1998 | Naganawa |
| 5,849,133 A | 12/1998 | Senderling et al. |
| 5,900,088 A | 5/1999 | Yamagiwa |

(Continued)

FOREIGN PATENT DOCUMENTS

| | | |
|---|---|---|
| BR | PI1102846 A2 | 7/2013 |
| CN | 1176618 A | 3/1998 |

(Continued)

OTHER PUBLICATIONS

"Hot Melt vs. Solvent-Based Adhesives." Sure Tack Systems, Nov. 25, 2014, https://suretacksystems.com/2014/11/hot-melt-adhesives-vs-solvent-based-adhesives-2/. (Year: 2014).*
Dainichiseika color & Chemicals MFG. Co. "Solvent-based Adhesives for Industrial Use". Accessed from <https://www.daicolor.co.jp/english/business/polymer/index.html>. (Year: 2016).*
Statement of Opposition as filed Sep. 17, 2021 against Japanese patent No. 68-48062B2 (including English language translation).
International Search Report and Written Opinion from PCT/US2017/040024 dated Aug. 28, 2017.
Wei, Junneng (editor), User Manual for construction Machinery Tires, published 1986 by China Railway Press, Beijing, pp. 259-263.

(Continued)

*Primary Examiner* — Robert C Dye
*Assistant Examiner* — Alexander D Booth
(74) *Attorney, Agent, or Firm* — Meredith E. Hooker; Jenny L. Sheaffer

(57) ABSTRACT

Methods for treating a cured inner liner as well as treated, cured inner liners resulting from such methods are disclosed. Also disclosed are tires containing the treated inner liners. The methods include treatment of the lower surface of inner liner surface with a rubber-containing liquid to produce a rubber-containing film thereupon.

16 Claims, No Drawings

(56) References Cited

U.S. PATENT DOCUMENTS

| | | | |
|---|---|---|---|
| 5,985,981 A * | 11/1999 | Alexander | C09J 123/283 525/123 |
| 6,101,767 A | 8/2000 | Georgeau | |
| 6,103,811 A | 8/2000 | Midorikawa et al. | |
| 6,120,869 A | 9/2000 | Cotsakis et al. | |
| 6,183,551 B1 | 2/2001 | Okamoto et al. | |
| 6,303,694 B1 | 10/2001 | Hogan et al. | |
| 6,436,498 B1 | 8/2002 | Rangwalla et al. | |
| 6,500,286 B1 | 12/2002 | Ishikawa et al. | |
| 6,502,360 B2 | 1/2003 | Carr, III et al. | |
| 6,505,455 B1 | 1/2003 | Georgeau | |
| 6,530,409 B1 | 3/2003 | Ishikawa et al. | |
| 6,679,018 B2 | 1/2004 | Georgeau et al. | |
| 6,803,412 B2 | 10/2004 | Nguyen-Misra et al. | |
| 6,923,233 B1 | 8/2005 | Girault et al. | |
| 7,073,550 B2 | 7/2006 | Reiter et al. | |
| 7,175,732 B2 | 2/2007 | Robinson et al. | |
| 7,182,114 B2 | 2/2007 | Yukawa | |
| 7,189,781 B2 | 3/2007 | Acevedo et al. | |
| 7,317,051 B2 | 1/2008 | Georgeau et al. | |
| 7,484,544 B2 | 2/2009 | Serra et al. | |
| 7,671,144 B2 | 3/2010 | Fujimoto et al. | |
| 7,681,613 B2 | 3/2010 | Yukawa et al. | |
| 7,717,146 B2 | 5/2010 | Yukawa et al. | |
| 7,743,808 B2 | 6/2010 | Yukawa | |
| 7,767,308 B2 | 8/2010 | Georgeau et al. | |
| 7,772,301 B2 | 8/2010 | Fensel et al. | |
| 8,028,796 B2 | 10/2011 | Ishihara | |
| 8,051,075 B2 | 11/2011 | Dampier | |
| 8,221,849 B2 | 7/2012 | Naito | |
| 8,245,743 B2 | 8/2012 | Hahn et al. | |
| 8,333,437 B2 | 12/2012 | Matsuda et al. | |
| 8,534,331 B2 | 9/2013 | Dubos et al. | |
| 8,999,093 B2 | 4/2015 | Yukawa | |
| 9,108,373 B2 | 8/2015 | Tanno et al. | |
| 2001/0000788 A1 | 5/2001 | Ono et al. | |
| 2002/0059971 A1 | 5/2002 | Yukawa et al. | |
| 2002/0115770 A1 | 8/2002 | Georgeau et al. | |
| 2004/0140030 A1* | 7/2004 | Hahn | B60C 19/00 152/565 |
| 2004/0176518 A1 | 9/2004 | Okamoto et al. | |
| 2004/0214950 A1 | 10/2004 | Nakamura et al. | |
| 2005/0098252 A1 | 5/2005 | Muraoka et al. | |
| 2005/0107499 A1 | 5/2005 | Georgeau et al. | |
| 2005/0143496 A1 | 6/2005 | Mueller | |
| 2005/0155686 A1 | 7/2005 | Yukawa et al. | |
| 2005/0284536 A1 | 12/2005 | Kojima et al. | |
| 2006/0169393 A1 | 8/2006 | Botts et al. | |
| 2006/0205907 A1 | 9/2006 | Guyer et al. | |
| 2007/0088137 A1 | 4/2007 | Georgeau et al. | |
| 2007/0282080 A1 | 12/2007 | Kawakami et al. | |
| 2008/0078489 A1 | 4/2008 | Fukutomi et al. | |
| 2008/0237537 A1 | 10/2008 | Huang et al. | |
| 2008/0264541 A1 | 10/2008 | Laubry et al. | |
| 2008/0292902 A1 | 11/2008 | Reid et al. | |
| 2009/0005498 A1 | 1/2009 | Lin et al. | |
| 2009/0018260 A1 | 1/2009 | Correia et al. | |
| 2009/0023837 A1 | 1/2009 | Okamatsu et al. | |
| 2009/0318599 A1 | 12/2009 | Brokamp | |
| 2010/0032066 A1* | 2/2010 | Nakao | B60C 13/00 235/492 |
| 2010/0043541 A1 | 2/2010 | Kobayakawa et al. | |
| 2010/0043933 A1 | 2/2010 | Breunig | |
| 2010/0068530 A1 | 3/2010 | Laubry | |
| 2010/0173167 A1 | 7/2010 | Vissing et al. | |
| 2010/0317796 A1 | 12/2010 | Huang et al. | |
| 2011/0003920 A1 | 1/2011 | Matsuda et al. | |
| 2011/0056694 A1 | 3/2011 | Sears et al. | |
| 2011/0247674 A1 | 10/2011 | Fujii et al. | |
| 2011/0308706 A1 | 12/2011 | Sandstrom et al. | |
| 2012/0040191 A1 | 2/2012 | Kohl et al. | |
| 2012/0071601 A1 | 3/2012 | Toshihiro et al. | |
| 2012/0073717 A1 | 3/2012 | Agostini et al. | |
| 2012/0123016 A1 | 5/2012 | Bolte et al. | |
| 2012/0125507 A1 | 5/2012 | Bormann et al. | |
| 2012/0234449 A1 | 8/2012 | Greiveldinger et al. | |
| 2012/0232210 A1 | 9/2012 | Cheng et al. | |
| 2013/0023617 A1 | 1/2013 | Okamoto | |
| 2013/0032262 A1 | 2/2013 | Bormann et al. | |
| 2013/0108882 A1 | 5/2013 | Stuart et al. | |
| 2013/0146195 A1 | 6/2013 | Dubos et al. | |
| 2013/0192736 A1 | 8/2013 | Song et al. | |
| 2013/0228259 A1 | 9/2013 | Breunig | |
| 2013/0260146 A1 | 10/2013 | Wright et al. | |
| 2014/0030537 A1 | 1/2014 | Ogasawara et al. | |
| 2014/0110032 A1 | 4/2014 | Ogasawara et al. | |
| 2014/0124114 A1 | 5/2014 | Hayashi et al. | |
| 2014/0138004 A1 | 5/2014 | Voge et al. | |
| 2014/0261965 A1 | 9/2014 | Tang et al. | |
| 2014/0329102 A1 | 11/2014 | Randall et al. | |
| 2015/0184045 A1 | 7/2015 | Goubard et al. | |
| 2015/0273944 A1 | 10/2015 | Yukawa | |
| 2015/0284610 A1 | 10/2015 | Zander et al. | |
| 2015/0364720 A1 | 12/2015 | Itoh | |
| 2015/0368512 A1 | 12/2015 | Bowman et al. | |
| 2016/0032158 A1 | 2/2016 | Tang et al. | |
| 2016/0068031 A1 | 3/2016 | Kaszas et al. | |
| 2016/0340905 A1 | 11/2016 | Tang et al. | |
| 2016/0362893 A1 | 12/2016 | Tang et al. | |
| 2017/0050474 A1 | 2/2017 | Laubry | |
| 2017/0282647 A1 | 10/2017 | Van Erp et al. | |
| 2017/0297281 A1 | 10/2017 | Yukawa et al. | |
| 2018/0016400 A1 | 1/2018 | Gutacker et al. | |
| 2018/0134082 A1* | 5/2018 | Randall | B60C 1/0008 |
| 2019/0084358 A1* | 3/2019 | Lee | B60C 11/0309 |
| 2019/0256745 A1 | 8/2019 | Meyer et al. | |
| 2020/0009912 A1 | 1/2020 | Liao et al. | |

FOREIGN PATENT DOCUMENTS

| | | |
|---|---|---|
| CN | 1259094 A | 7/2000 |
| CN | 1553866 A | 12/2004 |
| CN | 1669783 A | 9/2005 |
| CN | 1927608 A | 3/2007 |
| CN | 10103186 A | 7/2007 |
| CN | 101939349 A | 1/2011 |
| CN | 102548743 A | 7/2012 |
| CN | 103158437 A | 6/2013 |
| CN | 103502375 A | 1/2014 |
| CN | 103648798 A | 3/2014 |
| EP | 0135463 A1 | 3/1985 |
| EP | 0160614 A2 | 11/1985 |
| EP | 1174251 A2 | 1/2002 |
| EP | 1418199 A1 | 5/2002 |
| EP | 1418199 A1 | 5/2004 |
| EP | 1090069 B1 | 7/2004 |
| EP | 0991530 B1 | 9/2004 |
| EP | 1462500 A1 | 9/2004 |
| EP | 1512552 A2 | 3/2005 |
| EP | 1544254 A1 | 6/2005 |
| EP | 2042296 A1 | 1/2009 |
| EP | 2335911 A1 | 6/2011 |
| EP | 2738017 A1 | 6/2014 |
| EP | 2993061 A1 | 3/2016 |
| EP | 3009473 A1 | 4/2016 |
| EP | 3093165 A1 | 11/2016 |
| FR | 2273682 A | 1/1976 |
| FR | 2273682 A1 | 1/1976 |
| JP | S53-97046 A | 8/1978 |
| JP | S55-089371 A | 7/1980 |
| JP | S55-127212 A | 10/1980 |
| JP | S60-64834 A | 4/1985 |
| JP | H01-113483 A | 5/1989 |
| JP | H09-187869 A | 7/1997 |
| JP | H10-87884 A | 4/1998 |
| JP | H1087884 A | 4/1998 |
| JP | 2002-363484 A | 12/2002 |
| JP | 2004-196254 A | 7/2004 |
| JP | 200589596 A | 4/2005 |
| JP | 2006-007760 A | 1/2006 |
| JP | 2008133404 A | 6/2008 |
| JP | 2009-029972 A | 2/2009 |
| JP | 2009215497 A | 9/2009 |
| JP | 2009255601 A | 11/2009 |

(56) References Cited

FOREIGN PATENT DOCUMENTS

| | | |
|---|---|---|
| JP | 2010-106159 A | 5/2010 |
| JP | 2011-31709 A | 2/2011 |
| JP | 201391754 A | 5/2013 |
| JP | 2015-107690 A | 6/2015 |
| JP | 2015101672 A | 6/2015 |
| JP | 2015-131957 A | 7/2015 |
| JP | 2015182675 A | 10/2015 |
| JP | 2016-78817 A | 5/2016 |
| JP | 2016-514734 A | 5/2016 |
| KR | 20020037593 A | 5/2002 |
| KR | 10-0982923 B1 | 9/2010 |
| WO | 2000-37534 A1 | 6/2000 |
| WO | 2007/128797 A1 | 11/2007 |
| WO | 2008-013183 A1 | 1/2008 |
| WO | 2009-006915 A1 | 1/2009 |
| WO | 2009058420 A1 | 5/2009 |
| WO | 2012-134454 A1 | 10/2012 |
| WO | 2014-095650 A1 | 8/2014 |
| WO | 2014-145482 A1 | 9/2014 |
| WO | 2014198432 A1 | 12/2014 |
| WO | 2015/075040 A1 | 3/2015 |
| WO | 2015074031 A1 | 5/2015 |
| WO | 2015/143065 A1 | 9/2015 |
| WO | 2015165899 A1 | 11/2015 |
| WO | 2016-115560 A1 | 7/2016 |
| WO | 2016-146648 A1 | 9/2016 |

OTHER PUBLICATIONS

Wang, Mengjiao et al. (editors), Handbook of Rubber Industry, 2nd volume, copyright 1989, pp. 141 and 507-511.
Hepworth, Paul, Chemistry and Technology of Surfactants, Chapter 5 Non-ionic Surfactants, Copyright 2006.
Lee, Myung Jin, International Search Report with Written Opinion from PCT/US2017/039516, 12 pp. (Aug. 28, 2017).
Safety Data Sheet for QuickPrime Plus LVOC from Firestone Building Products Company, last revised Feb. 20, 2015.
Safety Data Sheet for QuickPrime Plus Primer from Firestone Building Products Company, last revised Jan. 29, 2016.
Safety Data Sheet for Single-Ply LVOC Primer from Firestone Building Products Company, last revised Mar. 11, 2014.
Safety Data Sheet for Single-Ply QuickPrime Primer from Firestone Building Products Company, last revised Jan. 28, 2013.
Technical Information Sheet for QuickPrime Plus LVOC from Firestone Building Products Company, last revised Feb. 13, 2012.
Technical Information Sheet for QuickPrime Plus from Firestone Building Products Company, last revised Aug. 2, 2013.
Technical Information Sheet for Single-Ply LVOC Bonding Adhesive-1168 from Firestone Building Products Company, last revised Jan. 17, 2012.
Technical Information Sheet for Single-Ply LVOC Bonding Adhesive from Firestone Building Products Company, last revised Sep. 17, 2015.
Technical Information Sheet for Single-Ply QuickPrime Primer from Firestone Building Products Company, last revised Feb. 21, 2012.
Lee, Myung Jin, International Search Report with Written Opinion from PCT/US2017/040024, 13 pp. (dated Aug. 28, 2017).
Jang, Gijeong, International Search Report with Written Opinion from PCT/US2017/066242, 13 pp. (dated Mar. 30, 2018).
Technical Information Sheet, EPDM—Solvent Free Bonding Adhesive, 4 pages, dated Nov. 7, 2016.
Technical Datasheet, Momentive SPUR 1050MM, dated Sep. 10, 2011.
Marketing Bulletin, Momentive SPUR 1050MM, dated Mar. 2017.
Technical Datasheet, Momentive SPUR 1015LM, dated Jan. 23, 2016.
Marketing Bulletin, Momentive SPUR 1015LM, dated Mar. 2017.
Kaneka MS Polymer, dated Dec. 9, 2016.
Technical Data Sheet, GENIOSIL STP E 30, dated Jul. 31, 2015.
Technical Data Sheet, GENIOSIL STP E 35, dated May 8, 2015.
International Search Report for Application No. PCT/US2014/030257 dated Sep. 17, 2014.
Written Opinion for Application No. PCT/US2014/030257 dated Sep. 2015.
Kristalex 3100 hydrocarbon resin data sheet; Eastman Chemical Company, 2019. (Year: 2019).
Written Opinion and IPRP for Application No. PCT/US2014/066101 dated May 2015.
International Search Report for Application No. PCT/US2014/066101 dated Jan. 27, 2015.
Kristalex 3100 hydrocarbon resin technical data sheet; Eastman Chemical Company; dated Feb. 28, 2018.
Shin Etsu, Silicone Release Coatings, Shin-Etsu Integrated System, dated Oct. 2012 (8 pages).
International Search Report from PCT application No. PCT/US2017/038493, dated Aug. 2017 (3 pages).
International Preliminary Report on Patentability and Written Opinion from PCT application No. PCT/US2017/038493, dated Dec. 2018 (10 pages).
3M, Low Fogging Adhesive Transfer Tapes, Technical Data, dated Oct. 2008 (4 pages).
European Extended Search Report and Search Opinion from EP application No. 17879667.8, transmitted by European Patent Office dated Jul. 30, 2020.
International Search Report and Written Opinion from PCT/US2017/066271 dated Apr. 9, 2018.
International Search Report and Written Opinion from PCT/US2017/066368 dated Apr. 10, 2018.
International Preliminary Report on Patentability from PCT/US2017/038493 dated Dec. 25, 2018.
International Preliminary Report on Patentability from PCT/US2017/039516 dated Jan. 1, 2019.
International Preliminary Report on Patentability from PCT/US2017/066271 dated Jun. 18, 2019.
International Preliminary Report on Patentability from PCT/US2017/040024 dated Jan. 1, 2019.
International Preliminary Report on Patentability from PCT/US2017/066368 dated Jun. 18, 2019.
International Preliminary Report on Patentability from PCT/US2017/066242 dated Jun. 18, 2019.
INEOS Oligomers—INDOL Polybutene Specifications and Typical, undated, downloaded Oct. 28, 2016.
Technical Information Sheet—QuickSeam Splice Tape, last modified Jul. 25, 2013.
Technical Information Sheet—EcoWhite QuickSeam Splice Tape, last modified Dec. 8, 2015.
International Search Report from PCT/US2017/038493 dated Aug. 23, 2017.
International Search Report and Written Opinion from PCT/US2017/039516 dated Aug. 28, 2017.
International Search Report and Written Opinion from PCT/US2017/066242 dated Mar. 30, 2018.
European Extended Search Report and Search Opinion from EP application No. 17821258.5, transmitted by the European Patent Office dated Jan. 30, 2020.
European Extended Search Report and Search Opinion from EP application No. 17879743.7, transmitted by the European Patent Office dated Jul. 31, 2020.
European Extended Search Report and Search Opinion from EP application No. 17880817.6 transmitted by the European Patent Office dated Jul. 13, 2020.
Notice of Reasons for Refusal in opposition filed against Japanese patent No. 68-48062B2 (including English language translation), dated Feb. 2022.
European search report and written opinion from EP application 17879677, dated Jul. 30, 2022.
International search report from PCT application PCT/US2017/038493, dated Aug. 23, 2017.
International search report and written opinion from PCT application PCT/US2017/039516, dated Aug. 28, 2017.
International search report and written opinion from PCT application PCT/US2017/040024, dated Aug. 28, 2017.

(56) References Cited

OTHER PUBLICATIONS

International search report and written opinion from PCT application PCT/US2017/066242, dated Mar. 30, 2018.
Written opinion from EP application 17821258.5, dated Jan. 30, 2020.
Written opinion from EP application 17879473.7, dated Jul. 31, 2020.
Written opinion from EP application 17880817.6, dated Jul. 13, 2020.

* cited by examiner

METHODS FOR TREATING INNER LINERS, INNER LINERS RESULTING THEREFROM AND TIRES CONTAINING SUCH INNER LINERS

FIELD

The present application is directed to methods for treating a cured inner liner; to treated, cured inner liners resulting from such methods; and to tires containing the treated inner liners.

BACKGROUND

When an uncured tire is placed into a tire mold for curing, the radially innermost component of the tire is often the inner liner. During the curing process that takes place in the tire mold, a bladder is inflated and presses against the radially inward-facing surface of the inner liner (the lower surface of the inner liner). In order to prevent sticking (or co-curing) of the lower surface of the inner liner to the bladder, a polysiloxane-containing release may be applied to the lower surface of inner liner (prior to the tire body being placed into the tire mold). While the polysiloxane-containing release provides the advantage of preventing sticking of the inner liner surface to the bladder in the tire mold, it is disadvantageous after the cured tire is removed from the mold because it remains upon the lower surface of the cured inner liner (as part of the rubber) and inhibits adhesion of other materials to the lower surface. Alternatively, some tires are manufactured without the lower surface of their inner liner being treated with a polysiloxane-containing release. Regardless of whether the inner liner has been release treated, after a tire having a cured inner liner is removed from a tire mold, the manufacturer may desire to install one or more components radially inward of the inner liner. Exemplary such components include noise barriers (e.g., foam noise barriers), an air barrier layer, a sealant layer, a run-flat insert, or an electronic communication module. These components may be positioned securely against the lower surface of the inner liner using an adhesive.

SUMMARY

Disclosed herein are methods for treating a cured inner liner; treated, cured inner liners resulting from such methods; methods for producing a tire comprising a treated, cured inner liner; and tires containing the treated inner liners.

In a first embodiment, a method for treating a cured inner liner is disclosed. The method comprises: (a) providing a cured inner liner comprising rubber, a majority of which comprises butyl rubber (optionally halogenated), wherein the cured inner liner has an upper and a lower surface; (b) treating the lower surface of the cured inner liner with a rubber-containing liquid wherein the rubber-containing liquid comprises at least one conjugated diene monomer-containing rubber polyurethane and at least one solvent, and allowing the rubber-containing liquid to dry upon the treated surface of the cured inner liner, thereby producing a rubber-containing film upon the dried, treated surface.

In a second embodiment, a treated, cured inner liner is disclosed.

In a third embodiment, a method for producing a tire comprising a cured inner liner and at least one component positioned radially inward of the cured inner liner is disclosed. The method comprises: (a) providing a tire body comprising a cured inner liner comprising rubber, a majority of which comprises butyl rubber (optionally halogenated), wherein the cured inner liner comprises an upper and a lower surface with the lower surface positioned radially inward within the tire; (b) treating the lower surface of the cured inner liner with a rubber-containing liquid wherein the rubber-containing liquid comprises at least one conjugated diene monomer-containing rubber, polyurethane and at least one solvent; allowing the rubber-containing liquid to dry upon the treated lower surface of the cured inner liner, thereby producing a rubber-containing film upon the lower surface of the cured inner liner; and (d) adhering the component to the rubber-containing film upon the lower surface of the cured inner liner.

In a fourth embodiment, a cured tire comprising a tire body, a cured inner liner, and at least one component positioned radially inward of the cured inner liner is disclosed. The cured tire comprises: a cured inner liner comprising rubber, a majority of which comprises butyl rubber (optionally halogenated), wherein the cured inner liner has an upper surface and a lower surface with the lower surface positioned radially inward within the tire and, the lower surface of the cured inner liner includes a rubber-containing film comprising at least one conjugated diene monomer-containing rubber and polyurethane. The rubber-containing film has a thickness of about 0.1 to about 25 micrometers, and the at least one component positioned radially inward of the cured inner liner is adhered to the rubber-containing film of the lower surface of the cured inner liner.

DETAILED DESCRIPTION

Disclosed herein are methods for treating a cured inner liner; treated, cured inner liners resulting from such methods; methods for producing a tire comprising a cured inner liner; and tires containing the treated inner liners.

In a first embodiment, a method for treating a cured inner liner is disclosed. The method comprises: (a) providing a cured inner liner comprising rubber, a majority of which comprises butyl rubber (optionally halogenated), wherein the cured inner liner has an upper and a lower surface; (b) treating the lower surface of the cured inner liner with a rubber-containing liquid wherein the rubber-containing liquid comprises at least one conjugated diene monomer-containing rubber polyurethane and at least one solvent, and allowing the rubber-containing liquid to dry upon the treated surface of the cured inner liner, thereby producing a rubber-containing film upon the dried, treated surface.

In a second embodiment, a treated, cured inner liner is disclosed.

In a third embodiment, a method for producing a tire comprising a cured inner liner and at least one component positioned radially inward of the cured inner liner is disclosed. The method comprises: (a) providing a tire body comprising a cured inner liner comprising rubber, a majority of which comprises butyl rubber (optionally halogenated), wherein the cured inner liner comprises an upper and a lower surface with the lower surface positioned radially inward within the tire; (b) treating the lower surface of the cured inner liner with a rubber-containing liquid wherein the rubber-containing liquid comprises at least one conjugated diene monomer-containing rubber, polyurethane and at least one solvent; allowing the rubber-containing liquid to dry upon the treated lower surface of the cured inner liner, thereby producing a rubber-containing film upon the lower surface of the cured inner liner; and (d) adhering the component to the rubber-containing film upon the lower surface of the cured inner liner.

In a fourth embodiment, a cured tire comprising a tire body, a cured inner liner, and at least one component positioned radially inward of the cured inner liner is disclosed. The cured tire comprises: a cured inner liner comprising rubber, a majority of which comprises butyl rubber (optionally halogenated), wherein the cured inner liner has an upper surface and a lower surface with the lower surface positioned radially inward within the tire and, the lower surface of the cured inner liner includes a rubber-containing film comprising at least one conjugated diene monomer-containing rubber and polyurethane. The rubber-containing film has a thickness of about 0.1 to about 25 micrometers, and the at least one component positioned radially inward of the cured inner liner is adhered to the rubber-containing film of the lower surface of the cured inner liner.

Definitions

The terminology as set forth herein is for description of the embodiments only and should not be construed as limiting the invention as a whole.

As used herein, the term "majority" means more than 50% (e.g., 50.5%, 51%, 60%, etc.) and may encompass 100%.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. In certain embodiments, the 100 parts rubber should be understood to refer to 100 parts of the at least one diene monomer-containing rubber. 100 parts of rubber may also be referred to as 100 phr.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the term "radially inward" is a relative term indicating that a component is positioned or arranged closer to or facing the inner portion of a tire, with the understanding that the road-contacting tread is generally the radially outermost portion of a tire. As a non-limiting example, body plies within a tire are positioned radially inward of the road-contacting tread of the tire.

Treated, Cured Inner Liner

As discussed above, the methods of the first and third embodiments disclosed herein include treating the surface of a cured inner liner, more specifically the lower surface of the cured inner liner. Additionally, the third and fourth embodiments disclosed herein also pertain to a cured inner liner (and a tire comprising a cured inner liner) which comprises rubber, a majority by weight of which comprises butyl rubber (optionally halogenated) and has an upper surface and a lower surface with a rubber-containing film upon the lower surface; in certain embodiments of the third and fourth embodiments, the rubber-containing film can be understood as resulting from a method according to the first or third embodiments disclosed herein. The cured inner liner refers to the cured version of an inner liner which generally is cured in a tire mold as part of the tire making process. The lower surface of the cured inner liner refers to the surface that will face radially inward when the inner liner is incorporated into a tire. According to the methods of the first and third embodiments, the cured inner liner that is provided may be part of a tire and the lower surface of the inner liner (or cured inner liner) refers to the surface that will be radially inward facing when the inner liner is contained within a tire. As discussed in more detail infra the methods of the first and third embodiments produce a rubber-containing film upon the lower surface of the cured inner liner by applying a rubber-containing liquid and allowing it to dry. Similarly, the cured inner liner (and tire comprising a cured inner liner) according to the second and fourth embodiments disclosed herein also include a rubber-containing film upon the lower surface of the cured inner liner.

In certain embodiments of the first and third embodiments, the cured inner liner that has its lower surface treated with the rubber-containing liquid has had its lower surface pre-treated with a release treatment comprising polysiloxane-moieties. In certain embodiments of the first and third embodiments, the cured inner liner comprising rubber, a majority of which comprises butyl rubber (optionally halogenated) wherein the cured inner liner has an upper and a lower surface, has a lower surface further comprising a release treatment comprising polysiloxane moieties. Such a release treatment allows for a tire body containing the release treatment upon the lower surface of its inner liner to be cured in a tire mold and pressed against a curing bladder without sticking or co-curing of the inner liner's lower surface to the curing bladder. Similarly, in certain embodiments of the second and fourth embodiments, the cured inner liner with a lower surface including (comprising) a rubber-containing film is a cured inner liner which comprises polysiloxane moieties within its lower surface. As discussed in more detail below, when the lower surface of the cured inner liner upon which the rubber-containing film is produced (or upon which the rubber-containing film exists) comprises a release treatment comprising polysiloxane moieties, treatment with the rubber-containing liquid and drying of that rubber-containing liquid produces a rubber-containing film without adhesive properties. In other words, the rubber-containing film is non-adhesive. In certain embodiments of the first-fourth embodiments, a rubber-containing film that is non-adhesive may also be considered to be an adhesion film which increases the adherability of the lower surface of the cured inner liner. By adherability is meant the ability of other materials to adhere to the lower surface of the cured inner liner. Preferably, the non-adhesive film or adhesion film is capable of having a separate adhesive (e.g., a PSA) adhered to it. Notably, when the lower surface of the cured inner liner comprises a release treatment comprising polysiloxane moieties (i.e., prior to treatment with the rubber-containing liquid), the lower surface is not capable of having a separate adhesive (e.g., a PSA) adhere to it. Thus, in such embodiments, the rubber-containing film produced by the methods of the first and third embodiments disclosed herein as well as the rubber-containing film according to the second and fourth embodiment can be understood as improving the adherability of the lower surface of the cured inner liner.

As used herein, a polysiloxane moiety refers to the structure I, as follows: —[Si—O]$_x$—. Thus, by referring to polysiloxane moieties is meant that x is an integer of at least 2. In certain embodiments of the first-fourth embodiments, the release treatment comprises polysiloxane moieties wherein x is an integer of at least 50. In certain embodiments of the first-fourth embodiments, the release treatment comprises polysiloxane moieties wherein x is an integer ranging from 2 to 400 (e.g., 2, 5, 10, 20, 30, 40, 50, 75, 100, 150, 200, 250, 300, 350, 400), including 2 to 350, 2 to 300, 2 to 250, 2 to 200, 2 to 150, 2 to 100, 2 to 75, 2 to 50, 5 to 350, 5 to 300, 5 to 250, 5 to 200, 5 to 150, 5 to 100, 5 to 75, 5 to 50, 10 to 350, 10 to 300, 10 to 250, 10 to 200, 10 to 150, 10 to 100, 10 to 75, 10 to 50, 50 to 400, 50 to 350, 50 to 300, 50 to 250, or 50 to 200. As those of skill in the art will appreciate, each Si in structure I is capable of forming four bonds in total and, thus, each intermediary Si (e.g., when x=4 this would be the $2^{nd}$ and $3^{rd}$ Si) is bonded to two hydrocarbyl groups and each terminal Si (e.g., when x=4 this would be the $1^{st}$ and $4^{th}$ Si) is bonded to two hydrocarbyl groups and one additional terminal group. Such polysiloxanes can be referred to as diorganopolysiloxanes. Notably, according to certain embodiments of the first-fourth embodiments, the two "organo" groups to which each intermediary Si is bonded need not be the same and each intermediary Si need not be bonded to the same two organo groups or the same combination of two organo groups. In certain embodiments of the first-fourth embodiments, the hydrocarbyl groups to which each intermediary Si is bonded comprise a methyl group; such a polysiloxane can be referred to as polydimethylsiloxane. Other exemplary polysiloxanes for use in effecting a release property to the lower surface of the inner liner during tire molding include, but are not limited to, dialkylpolysiloxanes such as diethylpolysiloxane, methylisopropylpolysiloxane, and methyldodecylpolysiloxane; diarylpolysiloxanes such as diphenylpolysiloxane; alkylphenylpolysiloxanes such as methylphenylpolysiloxane, dimethylsiloxane-methylphenylsiloxane copolymers, and dimethylsiloxane-diphenylsiloxane copolymers; alkylaralkylpolysiloxanes such as methyl(phenylethyl)polysiloxane and methyl(phenylpropyl) polysiloxane; and 3,3,3-trifluoropropylmethylpolysiloxane; in certain embodiments of the first-fourth embodiments, the release treatment comprises one or more of the foregoing polysiloxanes. The two organo groups on the intermediary Si and on the terminal Si of the polysiloxane may be independently selected from linear or branched alkyl having C1-C8, optionally substituted with at least one halogen (e.g., fluorine), and cycloalkyl having C3-C8. In certain embodiments of the first-fourth embodiments, each terminal Si of the polysiloxane chain is endblocked by a hydroxyl group, a hydrocarbyl group or an alkoxy group.

In certain embodiments of the methods of the first and third embodiments, the cured inner liner that has its lower surface treated with the rubber-containing liquid has not had its lower surface pre-treated with a release treatment comprising polysiloxane-moieties. In other words, in such embodiments of the first and third embodiments, the lower surface of the cured inner liner is essentially free of polysiloxane moieties. Similarly, in certain embodiments of the second and fourth embodiments, the cured inner liner with a lower surface which is essentially free of polysiloxane moieties. By essentially free of polysiloxane moieties is meant that the lower surface comprises less than 1% by weight, less than 0.5% by weight, less than 0.1% by weight, or even 0% by weight polysiloxane moieties. In certain embodiments of the first and third embodiments, the cured inner liner comprising rubber, a majority of which comprises butyl rubber (optionally halogenated) has a lower surface that is essentially free of polysiloxane moieties. Similarly, in certain embodiments of the second and fourth embodiments, the lower surface of the cured inner liner upon which includes (comprises) the rubber-containing film is essentially free of polysiloxane moieties. As discussed in more detail below, when the lower surface of the cured inner liner is essentially free of polysiloxane moieties, treatment with the rubber-containing liquid and drying of that rubber-containing liquid produces a rubber-containing film with adhesive properties. In other words, in such embodiments, the rubber-containing film (after drying or evaporation of solvent or solvents) is tacky or sticky. As referred to herein, the rubber-containing film is considered to be an adhesive film when it is capable of bonding to another surface (e.g., a foam noise barrier); as should be clear from the above description the capability of bonding to another surface is determined after drying or evaporation of solvent or solvents. Accordingly, in certain embodiments of the first-fourth embodiments, the rubber-containing film upon the lower surface of the inner liner comprises an adhesive film. In certain embodiments of the first-fourth embodiments, the adhesive film is sufficiently adhesive to allow adhesion of a polyurethane foam noise barrier with sufficient strength to exceed the tear strength of the polyurethane foam noise barrier; in certain such embodiments, the adhesive strength of the adhesive film is greater than 1.5 pounds per lineal inch of foam, and in other embodiments greater than 2 pounds per lineal inch of foam. Generally, when the adhesive film is sufficiently adhesive to allow adhesion of a polyurethane foam noise barrier with sufficient strength to exceed the tear strength of a polyurethane foam noise barrier, force applied in an attempt to remove the foam noise barrier from the lower surface of the inner liner will cause the foam to tear before causing the foam to separate from the lower surface of the inner liner at the adhesive film interface.

According to the first-fourth embodiments, the cured inner liner having a rubber-containing film upon its lower surface (as well as the cured inner liner which is treated with the rubber-containing liquid) comprises rubber, a majority by weight of which butyl rubber which is optionally halogenated. (Unless indicated to the contrary, the following discussion concerning rubber(s), filler(s) and other ingredients of the cured inner liner applies equally to the cured inner liner having a rubber-containing film upon its lower surface and to the cured inner liner which is treated with the rubber-containing liquid.) Moreover, the following discussion should also be understood as applying to the composition of the cured inner liner but not the rubber-containing film that is produced therein (as composition of the rubber-containing film is discussed in detail in a separate section). In other words, the cured inner liner comprises rubber, and a majority by weight of the rubber of such inner liner comprises one or more butyl rubbers and each of those butyl rubbers is optionally halogenated. (As discussed below, in certain embodiments of the first-fourth embodiments, the cured inner liner further comprises one or more fillers and optionally one or more curatives mixed with the butyl rubber(s).) Butyl rubber is a copolymer of isobutylene and a small amount of a diene-based monomer, typically isoprene or para-methylstyrene. The polymer chains of butyl rubber therefore typically have a highly saturated backbone. Butyl rubber typically contains more than about 90% isobutylene and less than about 10% diene-based monomer (e.g., isoprene or para-methylstyrene) by weight in the copolymer, including about 90-99.5% isobutylene and about 10 to about 0.5% diene-based monomer, about 95-99.5% isobutylene and about 5-0.5% diene-based monomer, about 96-99% isobutylene and about 4-1% diene-based monomer, about 97-98.5% isobutylene and about 1.5-3% diene-based monomer, and including about 98% isobutylene and about 2% diene-based monomer by weight in the copolymer.

Typically, the diene-based mer (e.g., isoprenyl or paramethylstyrenyl) units are distributed randomly in the polymer chains of butyl rubber. Non-limiting examples of suitable polymers for use as the at least one butyl rubber or a halogenated butyl rubber of the cured inner liner according to certain embodiments of the first-fourth embodiments disclosed herein include, but are not limited to, butyl rubber, chlorobutyl rubber, bromobutyl rubber, fluorobutyl rubber, iodobutyl rubber, copolymers thereof, and combinations thereof. In certain embodiments of the first-fourth embodiments, the cured inner liner comprises bromobutyl rubber. In certain embodiments of the first-fourth embodiments, the only rubber present in the cured inner liner (excepting the rubber-containing film) is bromobutyl rubber (i.e., of 100 parts or 100 phr of rubber present in the cured inner liner all 100 parts or 100 phr is bromobutyl rubber).

In certain embodiments of the first-fourth embodiments disclosed herein, the cured inner liner comprises other ingredients in addition to the optionally halogenated butyl rubber(s). These other ingredients of the cured inner liner may vary but will generally include one or more fillers (e.g., carbon black, clay or silica) and a cure package (e.g., a vulcanizing agent such as sulfur and one or more vulcanization accelerators). In certain embodiments of the first-fourth embodiments disclosed herein, the cured inner liner comprises one or more butyl rubbers (optionally halogenated) and 10-100 phr (including 20-80 phr, 30-70 phr, 15 phr, 20 phr, 30 phr, 40 phr, 50 phr, 60 phr, 70 phr, 80 phr, 90 phr, etc.) of one or more of the foregoing fillers. In certain embodiments of the first-fourth embodiments, the rubber of the cured inner liner comprises at least 60% by weight (e.g., 60%, 65%, 70%, 75%, 80%, 85%, 90%, 95% or 100% by weight) of at least one of: a butyl rubber or halogenated butyl rubber (or a combination thereof, as discussed above). In certain embodiments of the first-fourth embodiments, the rubber of the cured inner liner comprises at least one of the following rubbers in addition to the butyl or halogenated butyl rubber(s): natural rubber, polyisoprene, styrene-butadiene rubber, isoprene rubber, polybutadiene rubber (preferably at least 90% cis bond content, even more preferably at least 95% cis bond content), nitrile rubber (acrylonitrile-butadiene copolymers), or hydrogenated nitrile rubber.

The thickness of the cured inner liner utilized in or included within the first-fourth embodiments may vary. In certain embodiments of the first-fourth embodiments, the cured inner liner has a thickness of 0.5-2 mm. Since the thickness of the rubber-containing film is relatively small in comparison (as discussed further below), a thickness of 0.5-2 mm (to one or two significant digits) can be understood as applying to both the cured inner liner without the rubber-containing film as well as the cured inner liner with rubber-containing film upon its lower surface.

Rubber-Containing Liquid

As discussed above, according to the methods of the first and third embodiments disclosed herein, the lower surface of the cured inner liner is treated with a rubber-containing liquid. The rubber-containing liquid comprises at least one conjugated diene monomer-containing rubber, polyurethane and at least one solvent. By liquid is meant that the composition is pourable or at least flowable at room temperature (i.e., 23° C.). According to the first and third embodiments, the viscosity of the rubber-containing liquid may vary. In certain embodiments of the first and third embodiments, the rubber-containing liquid has a viscosity at room temperature of no more than 3000 centipoise, about 3000 to about 10 centipoise (e.g., 3000, 2500, 2000, 1500, 1000, 900, 800, 700, 600, 500, 400, 300, 200, 100, 50, 10 centipoise), 3000-10 centipoise, about 1500 to about 10 centipoise, 1500-10 centipoise, about 1000 to about 10 centipoise, 1000-10 centipoise, about 1000 to about 50 centipoise, or 1000-50 centipoise. The viscosities referred to herein can be determined using a Brookfield model RVF viscometer with a #3 spindle at 10 rpm for higher viscosities (greater than 1000) and a #2 spindle at 20 rpm for lower viscosities (1000 and less).

In certain embodiments of the first and third embodiments, the rubber-containing liquid comprises about 5 to about 40% (e.g., 5%, 8%, 10%, 15%, 18%, 20%, 25%, 30%, 35%, 40%) by weight of the at least one conjugated diene-monomer containing rubber. In certain embodiments of the first and third embodiments, the rubber-containing liquid comprises about 5 to about 25%, 5 to 25%, about 8 to about 25%, 8 to 25%, about 5 to about 20%, 5 to 20%, about 8 to about 20%, about 10 to about 20%, or 10 to 20% by weight of the at least one conjugated diene-monomer containing rubber. In certain embodiments of the first and third embodiments, the rubber-containing liquid has a solids content (i.e., based upon the total amount of conjugated diene-monomer containing rubber, polyurethane, and any filler(s)) of about 5 to about 45% (e.g., 5%, 8%, 10%, 15%, 18%, 20%, 25%, 30%, 35%, 40%, 45%). In certain embodiments of the first and third embodiments, the rubber-containing liquid has a solids content of about 5 to about 35%, 5 to 35%, about 8 to about 35%, 8 to 35%, about 5 to about 30%, 5 to 30%, about 8 to about 30%, 8 to 30%, about 5 to about 25%, 5 to 25%, about 8 to about 25%, 8 to 25%, about 5 to about 20%, 5 to 20%, about 8 to about 20%, or 8 to 20% by weight.

Rubber

As discussed above according to the methods of the first and third embodiments, the rubber-containing liquid utilized to treat the lower surface of the cured inner liner comprises at least one conjugated diene monomer-containing rubber. By conjugated diene monomer-containing rubber is meant a rubber polymer comprising at least one type of conjugated diene monomer. (The term polymer as used herein includes both homopolymers comprised of one type of monomer as well as copolymers comprised of two or more types of monomers.) It should be understood that the rubber or rubbers contained within the rubber-containing liquid will be the same rubber or rubbers contained within the rubber-containing film that is produced upon the lower surface of the inner liner. Similarly, as also discussed above the rubber-containing film of the second and fourth embodiments comprises at least one conjugated diene monomer-containing rubber. The rubber-containing liquid and/or rubber-containing film may comprise one or more than one conjugated diene monomer-containing rubber. While the concentration of conjugated diene monomer-containing rubber(s) within the rubber-containing liquid may vary (as discussed in more detail infra), the total amount of all conjugated diene monomer-containing rubber(s) should be understood as 100 parts or 100 phr so that the relative amount of other ingredients (i.e., polyurethane, solvent and optional ingredients such as filler(s) and isocyanate scavenger(s)) is provided in units of phr (i.e., parts per 100 parts rubber).

As those of skill in the art understand, a conjugated diene is a compound that has two double carbon-carbon bonds (i.e., two —C═C— bonds) that are separated by a single bond (i.e., —C—C—); thus, a conjugated diene will contain at least one —C=C—C=C— moiety. The particular structure of the conjugated diene monomer contained within the at least one conjugated diene monomer-containing rubber of the rubber-containing liquid and/or rubber-containing film of the first-fourth embodiments disclosed herein can vary. According to the first-fourth embodiments, one or more than one type of conjugated diene monomer can be utilized. By referring herein to one or more than one type of conjugated diene monomer is meant that the conjugated diene monomers may comprise all one formula or a mixture of formulas. As a non-limiting example, two types of conjugated diene monomers could encompass a combination of 1,3-butadiene and isoprene. In certain embodiments of the first-fourth embodiments disclosed herein, the conjugated diene monomer comprises at least one of 1,3-butadiene; isoprene; 1-3-pentadiene; 2,3-dimethyl-1,3-butadiene; 2-ethyl-1,3-butadiene; 2-methyl-1,3-pentadiene; 3-methyl-1,3-pentadiene; 4-methyl-1,3-pentadiene; 2,4-hexadiene; 1,3-hexadiene; 1,3-cyclopentadiene; 1,3-cyclohexadiene; 1,3-cycloheptadiene; or 1,3-cyclooctadiene. In certain embodiments of the first-fourth embodiments, the conjugated diene monomer comprises 1,3-butadiene. In certain embodiments of the first-fourth embodiments disclosed herein, the at least one conjugated diene monomer-containing rubber further comprises at least one type of vinyl aromatic monomer, i.e., in addition to the conjugated diene monomer. In certain embodiments of the first-fourth embodiments disclosed herein, the at least one type of vinyl aromatic monomer of the polymer chain comprises at least one of styrene, alpha-methyl styrene, p-methylstyrene, o-methylstyrene, p-butylstyrene, vinylnaphthalene, p-tert-butylstyrene, 4-vinylbiphenyl, 4-vinylbenzocyclobutene, 2-vinylnaphthalene, 9-vinylanthracene, 4-vinylanisole, or vinyl catechol. In certain embodiments of the first-fourth embodiments disclosed herein, the at least one type vinyl aromatic monomer of the conjugated diene monomer-containing rubber comprises styrene.

In certain embodiments of the first-fourth embodiments, the at least one conjugated diene monomer-containing rubber of rubber-containing liquid and/or the rubber-containing film comprises at least one of the following: butyl rubber, halogenated butyl rubber, polybutadiene (preferably at least 90% cis bond content, even more preferably at least 95% cis bond content), polyisoprene, natural rubber, or chlorinated polyisoprene; in certain such embodiments, a majority by weight (e.g., at least 51%, at least 60%, at least 70%, at least 80%, at least 90%, at least 95%, at least 98%, at least 99% or even 100%) of the rubber(s) of the rubber-containing liquid and/or rubber-containing film comprises one or more of the foregoing. As should be clear from the above discussion, butyl rubber is a copolymer of isobutylene and a small amount of a diene-based monomer, typically isoprene or para-methylstyrene, in relative amounts as discussed above. A butyl rubber comprising isobutylene and para-methylstyrene can also be described as polyisobutylene para-methylstyrene whereas a butyl rubber comprising isobutylene and isoprene can also be described as polyisobutylene or isobutylene isoprene rubber. In certain embodiments of the first-fourth embodiments, the at least one conjugated diene monomer-containing rubber comprises at least one butyl rubber selected from: polyisobutylene or polyisobutylene para-methylstyrene. In certain embodiments of the first-fourth embodiments, the at least one conjugated diene monomer-containing rubber comprises at least one halogenated butyl rubber selected from: chlorobutyl rubber, bromobutyl rubber, fluorobutyl rubber, or iodobutyl rubber. In certain embodiments of the first-fourth embodiments, the rubber-containing liquid and/or rubber-containing film is free of (i.e., contains 0 phr of) any rubbers other than conjugated diene-monomer containing rubber(s). (As discussed herein, the polyurethane of the rubber-containing liquid and rubber-containing film is not considered to be a rubber.) In certain embodiments of the first-fourth embodiments, the rubber-containing liquid and/or rubber-containing film comprises butyl rubber, halogenated butyl rubber, or a combination thereof; in certain such embodiments a majority by weight (e.g., at least 51%, at least 60%, at least 70%, at least 80%, at least 90%, at least 95%, at least 98%, at least 99% or even 100%) of the rubber(s) of the rubber-containing liquid and/or rubber-containing film comprises one or more of the foregoing. In certain embodiments of the first-fourth embodiments, the rubber-containing liquid and/or rubber-containing film comprises 100 parts (or 100 phr) of butyl rubber, halogenated butyl rubber, or a combination thereof. In such embodiments, one or more than one butyl rubber may be utilized, one or more than one halogenated butyl rubber may be utilized, one butyl rubber and more than one halogenated butyl rubber may be utilized, more than one butyl rubber and one halogenated butyl rubber may be utilized, or more than one butyl rubber and more than one halogenated butyl rubber may be utilized. In certain embodiments of the first-fourth embodiments, the rubber-containing liquid and/or rubber-containing film is essentially free of (i.e., contains less than 5 phr or 0 phr) of chloroprene rubber or polychloroprene. In certain embodiments of the first-fourth embodiments, the rubber-containing liquid and/or rubber-containing film is essentially free of (i.e., contains less than 5 phr or more preferably 0 phr) of any silicone-containing or silicone-based rubber. In certain embodiments of the first-fourth embodiments, the rubber-containing liquid and/or rubber-containing film is essentially free of (i.e., contains less than 5 phr or more preferably 0 phr) of any acrylic-containing or acrylic-based polymer. In certain embodiments of the first-fourth embodiments, the rubber-containing liquid and/or rubber-containing film is essentially free of (i.e., contains less than 5 phr or more preferably 0 phr) of styrene-butadiene rubber. In certain embodiments of the first-fourth embodiments, the rubber-containing liquid and/or rubber-containing film is essentially free of (i.e., contains less than 5 phr or more preferably 0 phr) of any isocyanate-containing or isocyanate-based polymer. In certain embodiments of the first-fourth embodiments, the rubber-containing liquid and/or rubber-containing film is essentially free of (i.e., contains less than 5 phr or more preferably 0 phr) of thermoplastic resin and thermoplastic polymer (e.g., polyamide resins or polymers, polyester resins or polymers, polynitrile resins or polymers, poly(meth)acrylate resins or polymers, polyvinyl resins or polymers, cellulose resins or polymers, fluorine resins or polymers, imide resins or polymers).

Polyurethane

As discussed above, according to the methods of the first and third embodiments, the rubber-containing liquid utilized to treat the lower surface of the cured inner liner comprises polyurethane. It should be understood that the polyurethane contained within the rubber-containing liquid will also be present within the rubber-containing film that is produced upon the lower surface of the inner liner (i.e., after drying of the rubber-containing liquid). Similarly, in addition to containing the at least one conjugated diene monomer-containing rubber, the rubber-containing film of the second and fourth embodiments will also comprise (include) polyurethane. The polyurethane component of the rubber-containing liquid used in the methods of the first and third embodiments may be added as a pre-reacted polyurethane solution or alternatively (and preferably) may be added to the at least one conjugated diene monomer-containing rubber and solvent as its constituent components. These constituent components of the polyurethane comprise at least one polyol component and at least one isocyanate component; optional additional components include one or more catalysts, one or more chain extenders, and one or more isocyanate scavengers.

The amount of polyurethane contained with the rubber-containing liquid that is used in the methods of the first and third embodiments may vary. Likewise, the amount of polyurethane that is present in the rubber-containing film upon the lower surface of the cured inner liner according to the first-fourth embodiments may also vary. As mentioned above, the amount of polyurethane in the rubber-containing liquid and in the rubber-containing film is discussed herein as parts per hundred rubber (phr), based upon 100 parts or phr of the at least one conjugated diene monomer-containing rubber. Since neither the rubber nor the polyurethane evaporate (unlike the solvent) the relative amount of polyurethane to rubber will remain generally constant when a given rubber-containing liquid dries to produce a rubber-containing film. The amounts of polyurethane discussed herein refer to either the amount of pre-reacted polyurethane added to form the rubber-containing liquid or to the total amount of polyurethane constituent components added to form the rubber-containing liquid. Furthermore, since polyurethanes are frequently identified according to their constituent components and the relative amounts thereof, the discussion herein as to the amounts of polyol, isocyanate, and other constituents of the polyurethane should be understood to apply equally to both a pre-reacted polyurethane that is added to the rubber-containing liquid as well as to embodiments where the individual components are added to the liquid.

According to the methods of the first and third embodiments, the amount and type of polyol component that is used in the rubber-containing liquid may vary. One or more than one polyol component may be utilized. In certain embodiments of the first-fourth embodiments, the polyol component comprises a polyether polyol, a resinous polyol, or a combination thereof. Resinous polyols include phenolic resins derived from the polymerization of alkyl phenols and formaldehyde. In certain preferred embodiments of the first-fourth embodiments, the polyol is a thermoplastic polyol.

In certain preferred embodiments of the first-fourth embodiments, the polyurethane of the rubber-containing liquid and of the rubber-containing film is a thermoplastic polyurethane (as opposed to a thermoset polyurethane). In certain embodiments of the first-fourth embodiments, the polyurethane of the rubber-containing liquid and of the rubber-containing film is a highly branched polyurethane such as can be derived from multi-functional polyisocyanates and multi-functional polyols.

According to the methods of the first and third embodiments, the amount and type of isocyanate component that is used in the rubber-containing liquid may vary. One or more than one isocyanate component may be utilized. In certain embodiments of the first-fourth embodiments, the isocyanate component comprises a polyfunctional isocyanate having two or more isocyanate functionalities per molecule. In certain embodiments of the first-fourth embodiments, the isocyanate component comprises methylene diphenyl diisocyanate, isophorone diisocyanate, 1,6-diisocyanate, or a combination thereof.

According to the methods of the first-fourth embodiments, the ratio of polyol component to isocyanate component in the polyurethane of the rubber-containing liquid and/or in the polyurethane of the rubber-containing film may vary. In certain embodiments of the first-fourth embodiments, the polyol component is present in an amount sufficient to provide an excess of hydroxyl groups to isocyanate groups. In certain embodiments of the first-fourth embodiments, this excess comprises a ratio of hydroxyl group to isocyanate groups of greater than 2:1, about 2:1 to about 3:1, or about 2.5:1. In other embodiments of the first-fourth embodiments, when a tri-functional isocyanate is used, the ratio should be higher, e.g., greater than 4:1, about 4:1 to about 5:1 or about 4.5:1. On a weight basis, about 5 to about 15 phr (e.g., 5, 10, 15, 5-15, 5-10, 7-10 phr) of isocyanate component are used with about 15 to about 30 phr (e.g., 15, 20, 25, 30, 15-30, 15-25 phr) polyol component.

In certain embodiments of the first and third embodiments, the polyurethane component of the rubber-containing liquid includes at least one chain extender. Various chain extenders may be utilized. Suitable chain extenders are generally selected from diols or short-chain polyols based upon alkylenes (e.g., having 2-6 carbons) or arylalkylenes. Exemplary chain extenders for use in the rubber-containing liquid include, but are not limited to: 1,4-butanediol; 1,6-hexanediol; cyclohexane dimethanol and hydroquinone bis (2-hydroxyethyl) ether; and combinations thereof.

In certain embodiments of the first and third embodiments, the polyurethane component of the rubber-containing liquid includes at least one catalyst. One or more than one catalyst may be utilized. Various catalysts may be utilized and several suitable catalysts are well known to those of skill in the art. In certain embodiments of the first and third embodiments, the polyurethane component includes (comprises) a catalyst comprising a metallic complex catalyst. Suitable metallic complex catalysts include Group I metal salts (e.g., alkali salts of carboxylic acids such as stearates, octoates and phenoxides); Lewis Acids (e.g., tin salts, zinc chloride, ferric chloride and tin octoate), and combinations thereof. In certain embodiments of the first and third embodiments, the polyurethane component includes (comprises) at least one alkali salt of a phenoxide (e.g., potassium p-nonylphenoxide). When a catalyst is used in the polyurethane component of the rubber-containing liquid of the first and third embodiments, the amount utilized may vary. In certain embodiments of the first and third embodiments, the catalyst is present in an amount of 1 to 10 phr, 2 to 5 phr, or 3 to 4 phr.

In certain embodiments of the first and third embodiments, the polyurethane component of the rubber-containing liquid includes at least one isocyanate scavenger. An isocyanate scavenger functions to scavenge any residual isocyanate groups after the polyol and isocyanate components have reacted. Exemplary isocyanate scavengers for use in the rubber-containing liquid of the first and third embodiments include methanol, other primary alcohols, water, secondary amines, and combinations thereof. The amount of isocyanate scavenger used in the rubber-containing liquid of the first and third embodiments may vary. In certain embodiments of the first and third embodiments, the polyurethane component of the rubber-containing liquid comprises at least one isocyanate scavenger in an amount of 1-40 phr, 3-30 phr, or 10-20 phr. In certain embodiments of the first and third embodiments, the isocyanate scavenger is added to the rubber-containing liquid after allowing time for reaction between the polyol and isocyanate components.

Solvent

As discussed above, according to the methods of the first and third embodiments, the rubber-containing liquid utilized to treat the lower surface of the cured inner liner comprises at least one solvent. By solvent is meant a compound capable of solubilizing the at least one conjugated diene monomer-containing rubber and the polyurethane. As discussed in more detail below, after removal or evaporation of the solvent(s) of the rubber-containing liquid, a rubber-containing film is left behind on the lower surface of the cured inner liner. The rubber-containing liquid may comprise one or more than one solvent. As those of skill in the art will appreciate, the solvent or solvents of the rubber-containing liquid may be selected so as to create a rubber-containing liquid which has a volatile organic carbon (VOC) content of 250 grams/liter or less (as measured by EPA Method 24). Alternatively, in other embodiments of the first and third embodiments, the VOC content of the rubber-containing liquid may be somewhat higher, e.g., about 255 to 700 grams/liter (e.g., 255, 275, 300, 325, 350, 375, 400, 425, 450, 475, 500, 525, 550, 575, 600, 625, 650, 675, 700 grams/liter), 300-700 grams/liter, 400-700 grams/liter, or 500-700 grams/liter.

According to the first and third embodiments, the amount of solvent in the rubber-containing liquid may vary. In certain embodiments of the first and third embodiments, the rubber-containing liquid comprises about 200 to about 2000 phr (e.g., 200 phr, 250 phr, 300 phr, 400 phr, 500 phr, 600 phr, 700 phr, 800 phr, 900 phr, 1000 phr, 1100 phr, 1200 phr, 1300 phr, 1400 phr, 1500 phr, 1600 phr, 1700 phr, 1800 phr, 1900 phr, 2000 phr) of at least one solvent. In certain embodiments of the first and third embodiments, the rubber-containing liquid comprises about 400-2000 phr, 400-1600 phr, 400-1200 phr, 500-2000 phr, 500-1600 phr, 500-1200 phr, 500-1000 phr, 700-2000 phr, 700-1600 phr, 700-1200 phr, 700-1000 phr of at least one solvent.

In certain embodiments of the first and third embodiments, the solvent of the rubber-containing liquid comprises a majority by weight (e.g., at least 51%, at least 55%, at least 60%, at least 65%, at least 70%, at least 75%, at least 80%, at least 85%, at least 90%, at least 95%, at least 98%, at least 99% or even 100% by weight of the solvent) of at least one hydrocarbon solvent. One or more than one hydrocarbon solvent may be utilized in the rubber-containing liquid. In certain embodiments, the at least one hydrocarbon solvent is selected from: alkanes having 4-12 carbons (e.g., butane, propane, hexane, heptane, naphtha); cycloalkanes and alkyl-cycloalkanes having 5-10 carbons (e.g., cyclopentane, cyclohexane); aromatic hydrocarbons and alkyl-substituted aromatic hydrocarbons having 6-12 carbons (e.g., benzene, toluene, xylene); non-halogenated alkenes having 2-20 carbons (e.g., 1-dodecene, 1-tetradecene); and combinations thereof. In certain embodiments of the first and third embodiments, the solvent of the rubber-containing liquid comprises a majority by weight (e.g., at least 51%, at least 55%, at least 60%, at least 65%, at least 70%, at least 75%, at least 80%, at least 85%, at least 90%, at least 95%, at least 98%, at least 99% or even 100% by weight of the solvent) of at least one aromatic hydrocarbon having 6-12 carbons, at least one alkyl-substituted aromatic hydrocarbon having 6-12 carbons, or a combination thereof. In certain embodiments of the first and third embodiments, the solvent of the rubber-containing liquid may further comprise at least one additional solvent selected from: alcohols having 1-8 carbons (e.g., methanol, ethanol, propanol, isopropanol) and ketones having 3-8 carbons (e.g., acetone, methyl-ethyl ketone); in such embodiments, the total amount of alcohol and/or ketone is preferably no more than 20% by weight, no more than 10% by weight, or no more than 5% by weight of the total amount of solvent so as to avoid precipitation of the at least one conjugated diene monomer-containing rubber from the rubber-containing liquid. As a non-limiting example, assuming 1000 phr of solvent in the rubber-containing liquid, 5% by weight acetone would be 50 phr acetone and 95% by weight hexane would be 950 phr.

In certain embodiments of the first and third embodiments, the solvent of the rubber-containing liquid comprises a majority by weight (e.g., at least 51%, at least 55%, at least 60%, at least 65%, at least 70%, at least 75%, at least 80%, at least 85%, at least 90%, at least 95%, at least 98%, at least 99% or even 100% by weight of the solvent) of at least one halogenated aromatic hydrocarbon solvent, at least one halogenated C1-C6 alkane, at least one halogenated C2-C6 alkene, or a combination thereof. Suitable halogenated aromatic hydrocarbon solvents, halogenated C1-C6 alkanes, and halogenated C2-C6 alkenes include those recognized by the environmental agencies of the United States or Canada as exempt as of the filing date of this application other than alcohols, ketones, esters, siloxanes, and gases. In certain embodiments of the first and third embodiments, the solvent of the rubber-containing liquid comprises a majority by weight of at least one of the following: methylene chloride (dichloromethane); 1,1,1-trichloroethane (methyl chloroform); 1,1,2-trichloro-1,2,2-trifluoroethane (CFC-113); trichlorofluoromethane (CFC-11); dichlorodifluoromethane (CFC-12); chlorodifluoromethane (HCFC-22); trifluoromethane (HFC-23); 1,2-dichloro 1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HFC-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); parachlorobenzotrifluoride (PCBTF); perchloroethylene (tetrachloroethylene); 3,3-dichloro-1,1,1,2,2-pentafluoropropane (HCFC-225ca); 1,3-dichloro-1,1,2,2,3-pentafluoropropane (HCFC-225cb); 1,1,1,2,3,4,4,5,5,5-decafluoropentane (HFC 43-10mee); difluoromethane (HFC-32); ethylfluoride (HFC-161); 1,1,1,3,3,3-hexafluoropropane (HFC-236fa); 1,1,2,2,3-pentafluoropropane (HFC-245ca); 1,1,2,3,3-pentafluoropropane (HFC-245ea); 1,1,1,2,3-pentafluoropropane (HFC-245eb); 1,1,1,3,3-pentafluoropropane (HFC-245fa); 1,1,1,2,3,3-hexafluoropropane (HFC-236ea); 1,1,1,3,3-pentafluorobutane (HFC-365mfc); chlorofluoromethane (HCFC-31); 1 chloro-1-fluoroethane (HCFC-151a); 1,2-dichloro-1,1,2-trifluoroethane (HCFC-123a); 1,1,1,2,2,3,3,4,4-nonafluoro-4-methoxy-butane ($C_4F_9OCH_3$ or HFE-7100); 2-(difluoromethoxymethyl)-1,1,1,2,3,3,3-heptafluoropropane (($CF_3$)$_2$$CFCF_2OCH_3$); 1-ethoxy-1,1,2,2,3,3,4,4,4-nonafluorobutane ($C_4F_9OC_2H_5$ or HFE-7200); 2-(ethoxydifluoromethyl)-1,1,1,2,3,3,3-heptafluoropropane (($CF_3$)$_2$$CFCF_2OC_2H_5$); 1,1,1,2,2,3,3-heptafluoro-3-methoxy-propane (n-$C_3F_7OCH_3$, HFE-7000); 3-ethoxy-1,1,1,2,3,4,4,5,5,6,6,6-dodecafluoro-2-(trifluoromethyl) hexane (HFE-7500); 1,1,1,2,3,3,3-heptafluoropropane (HFC 227ea); 1,1,1,2,2,3,4,5,5,5-decafluoro-3-methoxy-4-trifluoromethyl-pentane (HFE-7300); trans-1,3,3,3-tetrafluoropropene; $HCF_2OCF_2H$ (HFE-134); $HCF_2OCF_2OCF_2H$ (HFE-236cal2); $HCF_2OCF_2CF_2OCF_2H$ (HFE-338pcc13); $HCF_2OCF_2OCF_2CF_2OCF_2H$ (H-Galden 1040x or H-Galden ZT 130 (or 150 or 180)); trans 1-chloro-3,3,3-trifluoroprop-1-ene; 2,3,3,3-tetrafluoropropene; perfluorocarbon compounds which fall into the following classes: (i) cyclic, branched, or linear, completely fluorinated alkanes; or (ii) cyclic, branched, or linear, completely fluorinated ethers with no unsaturations; and combinations thereof. One or more than one halogenated aromatic hydrocarbon solvent, one or more than one halogenated C1-C6 alkane, one or more than one halogenated C2-C6 alkene, or a combination thereof may be utilized. In certain embodiments of the first and third embodiments, the rubber-containing liquid further comprises a minority by weight of at least one hydrocarbon solvent (as discussed above, i.e., alkanes having 4-12 carbons, cycloalkanes and alkyl-cycloalkanes having 5-10 carbons, aromatic hydrocarbons and alkyl-substituted aromatic hydrocarbons, non-halogenated alkenes having 2-20 carbons). As used herein, the term minority by weight refers to less than 50% and include 49% or less, 45% or less, 40% or less, 30% or less, 20% or less, 15% or less, 10% or less, and 5% or less. It should be understood that it is possible to formulate a rubber-containing liquid which has a VOC content of 250 grams/liter or less by utilizing a majority of weight of at least one halogenated aromatic hydrocarbon solvent, optionally in combination with a minority by weight of at least one hydrocarbon solvent. In certain embodiments of the first and third embodiments, the solvent of the rubber-containing liquid may further comprise at least one additional solvent selected from: alcohols having 1-8 carbons (e.g., methanol, ethanol, propanol, isopropanol) and ketones having 3-8 carbons (e.g., acetone, methyl-ethyl ketone); in such embodiments, the total amount of alcohol and/or ketone is preferably no more than 20% by weight, no more than 10% by weight, or no more than 5% by weight of the total amount of solvent so as to avoid precipitation of the at least one conjugated diene monomer-containing rubber from the rubber-containing liquid. In certain embodiments of the first and third embodiments, the solvent of the rubber-containing liquid comprises a majority by weight (e.g., at least 51%, at least 55%, at least 60%, at least 65%, at least 70%, at least 75%, at least 80%, at least 85%, at least 90%, at least 95%, at least 98%, at least 99% or even 100% by weight of the solvent) of parachlorobenzotrifluoride (also known as 1-chloro-4-(trifluoromethyl)benzene).

Filler

In certain embodiments of the first-fourth embodiments, the rubber-containing liquid and/or the rubber-containing film contains (further comprises) at least one filler. In certain embodiments of the first-fourth embodiments, the at least one filler comprises a reinforcing filler. One or more than one filler or reinforcing filler may be utilized in the rubber-containing liquid or be present in the rubber-containing film. The total amount of filler(s) used in the rubber-containing liquid or present in the rubber-containing film may vary. In certain embodiments of the first-fourth embodiments, the rubber-containing liquid and/or the rubber-containing film contains (further comprises) at least one filler in an amount of about 5 to about 50 phr (e.g., 5 phr, 10 phr, 15 phr, 20 phr, 25 phr, 30 phr, 35 phr, 40 phr, 45 phr, 50 phr); in certain such embodiments the at least one filler comprises at least one reinforcing filler. In certain embodiments of the first-fourth embodiments, the rubber-containing liquid and/or rubber-containing film contains (further comprises) at least one filler in an amount of about 5 to about 25 phr, 5 to 25 phr, about 5 to about 20 phr, 5 to 20 phr, about 5 to about 15 phr, or 5 to 15 phr; in certain such embodiments, the at least one filler comprises at least one reinforcing filler. In certain embodiments of the first-fourth embodiments, the only filler(s) utilized in the rubber-containing liquid and/or present in the rubber-containing film is/are reinforcing filler(s). In certain embodiments of the first-fourth embodiments, the at least one filler comprises at least one of: carbon black, silica, calcium carbonate, metal oxide(s) (e.g., zinc oxide, titanium oxide, magnesium oxide, aluminum oxide), with reinforcing grades of the foregoing being particularly preferred (e.g., N100, N200, N300, N400, N500 grades of carbon black). In certain embodiments of the first-fourth embodiments, the rubber-containing liquid and/or the rubber-containing film contains (further comprises) reinforcing carbon black filler in one of the foregoing amounts. In certain embodiments of the first and third embodiments, the at least one filler is added to the rubber-containing liquid as a dispersion (e.g., an aqueous dispersion) containing about 10% to about 50% by weight filler (based upon the total weight of the dispersion); in certain such embodiments, the at least one filler comprises carbon black and the dispersion is an aqueous dispersion of carbon black.

Other Ingredients

In certain embodiments of the first-fourth embodiments, the rubber-containing liquid and/or the rubber-containing film contains (further comprises) one or more additional ingredients. Exemplary such additional ingredients include plasticizers and antioxidants. In certain embodiments of the first-fourth embodiments, the rubber-containing liquid and the rubber-containing film are essentially free of any plasticizer (e.g., oil). By essentially free of any plasticizer is meant 5 phr or less, and in certain embodiments 1 phr or less, or even 0 phr. In other embodiments of the first-fourth embodiments, the rubber-containing liquid and/or the rubber-containing film comprise up to 5 phr of at least one plasticizer. In certain embodiments of the first-fourth embodiments, the rubber-containing liquid and/or rubber-containing film comprises about 1 to about 10 phr (e.g., 1 phr, 2 phr, 3 phr, 4 phr, 5 phr, 6 phr, 7 phr, 8 phr, 9 phr, 10 phr), 1 to 10 phr, about 1 to about 5 phr, or 1 to 5 phr of at least one antioxidant.

In certain embodiments of the first-fourth embodiments, the rubber-containing liquid and/or rubber-containing film contains (further comprises) a cure package (e.g., a vulcanizing agent such as sulfur and one or more vulcanization accelerators). In other embodiments of the first-fourth embodiments, the rubber-containing liquid and/or rubber-containing film are substantially free or completely free of cure agents (e.g., sulfur) and vulcanization accelerators (e.g., DPG, MBTS, TBBS). By substantially free is meant less than 5 phr (in total) of cure agents and vulcanization accelerators, preferably less than 1 phr (in total) of cure agents and vulcanization accelerators, or less than 0.1 phr (in total) of cure agents and vulcanization accelerators. In certain embodiments of the first-fourth embodiments wherein the lower surface of the inner liner (prior to treatment with the rubber-containing liquid) is substantially free of polysiloxane moieties, the rubber-containing liquid and the rubber-containing film comprise a cure package; in certain such embodiments the cure package comprises at least one cure agent (e.g., sulfur) and at least one vulcanization accelerator. In certain embodiments of the first-fourth embodiments wherein the lower surface of the inner liner comprises polysiloxane moieties, the rubber-containing liquid and the rubber-containing film are substantially free of cure agents and vulcanization accelerators, as discussed above.

In those embodiments of the first-fourth embodiments wherein the rubber-containing liquid and/or rubber-containing film contains (further comprises) a cure package comprising a vulcanizing agent and at least one vulcanization accelerator, the amount and identify of the vulcanizing agent and at least one vulcanization accelerator may vary. In certain embodiments of the first-fourth embodiments disclosed herein, the at least one vulcanization accelerator is selected from at least one of the following classes of vulcanization accelerators: thiurams, thioureas, dithiocarbamates, xanthates, or thiophosphates. In certain embodiments of the first-fourth embodiments, the at least one vulcanization accelerator comprises a thiazole, optionally in combination with one of more vulcanization accelerators from one or more of the foregoing classes. Non-limiting examples of vulcanizing accelerators that belong to the class of thiurams include: TMTM (tetramethyl thiuram monosulfide), TMTD (tetramethyl thiuram disulfide), DPTT (dipentamethylene thiuram tetrasulfide), TETD (tetraethyl thiuram disulfide), TiBTD (tetraisobutyl thiuram disulfide), and TBzTD (tetrabenzyl thiuram disulfide). Non-limiting examples of vulcanizing accelerators that belong to the class of thioureas include: ETU (ethylene thiourea), DPTU (N,N-diethyl thiourea), DETU (N,N-dibutylthiourea), and DBTU (diphenyl thiourea). Non-limiting examples of vulcanizing accelerators that belong to the class of dithiocarbamates include: ZDMC (zinc dimethyl dithiocarbamate), ZDEC (zinc diethyl dithiocarbamate), ZDBC (zinc dibutyl dithiocarbamate), ZEDC (zinc N-ethyl-dithiocarbamate), CDMC (copper dimethyl dithiocarbamate) and ZBEC (zinc dibenzyl dithiocarbamate). Non-limiting examples of vulcanizing accelerators that belong to the class of xanthates include: ZIX (zinc isopropyl xanthate). Non-limiting examples of vulcanizing accelerators that belong to the class of thiophosphates include: ZBDP (Zinc-O,O-di-N-phosphorodithioate). Non-limiting examples of vulcanizing accelerators that belong to the class of thiazoles incluee: MBT (2-mercaptobenzothiazole), MBTS (2,2-benzothiazole disulfide), ZMBT (zinc 2-mercaptobenzothiazole) and CMBT (copper 2-mercaptobenzothiazole). Additional examples of suitable vulcanizing accelerators for use in certain embodiments of the first-fourth embodiments disclosed herein include, but are not limited to, sulfonamides (e.g., N-cyclohexyl-2-benzothiazole-sulfenamide (CBS), N-tert-butyl-2-benzothiazole-sulfenamide (TBBS), and the like); guanidine vulcanization accelerators (e.g., diphenyl guanidine (DPG) and the like); and carbamate vulcanizing accelerators (e.g., zinc dibutyl dithocarbamate (ZDBC), zinc dibenzyl dithiocarbamate (ZBEC), zinc diethyl dithiocarbamate (ZDEC), zinc dimethyl dithiocarbamate (ZDMC), zinc N-ethyl-dithiocarbamate (ZEDC), copper dimethyl diothiocarbmate (CDMC), and the like), and combinations thereof; such vulcanization accelerators can be used either alone, in combination, or in combination with one of the foregoing classes of vulcanization accelerators. Generally, the total amount of vulcanization accelerator (when used) ranges from 0.5 to 15 phr (e.g., 0.5, 1, 2, 3, 4, 5, 6, 7, 8, 9, 10, 11, 12, 13, 14, 15 phr), 0.5 to 10 phr, 1 to 5 phr, or 2 to 10 phr. In certain embodiments of the first-fourth embodiments, the vulcanizing agent (when present) is used in an amount ranging from 0.1 to 10 phr (e.g., 0.1, 0.5, 1, 2, 3, 4, 5, 6, 7, 8, 9, 10 phr), including from 0.1 to 7.5 phr, including from 0.1 to 5 phr, and preferably from 0.1 to 3.5 phr.

Allowing Liquid to Dry

As discussed above, according to the methods of the first and third embodiments, after the lower surface of the cured inner liner is treated with the rubber-containing liquid, the liquid is allowed to dry upon the treated surface of the cured inner liner, thereby producing a rubber-containing film upon the dried, treated surface (i.e., upon the lower surface of the inner liner). According to the methods of the first and third embodiments, the drying of the rubber-containing liquid upon the lower surface of the cured inner liner may employ various drying methods. According to certain embodiments of the first and third embodiments, the drying comprises at least one of: allowing the solvent(s) of the rubber-containing liquid to evaporate at room temperature; allowing the solvent(s) of the rubber-containing liquid to evaporate at a temperature above room temperature; circulating air (or a semi-inert or inert gas such as nitrogen or argon) that is at least one of room temperature, heated, or dehydrated over the treated surface of the cured inner liner; or subjecting the treated surface of the cured inner liner to a reduced pressure atmosphere. Preferably, the drying lasts less than 60 seconds, even more preferably less than 30 seconds or less than 15 seconds before sufficient solvent is removed to produce the rubber-containing film.

Rubber-Containing Film

As discussed above, according to the methods of the first and third embodiments, a rubber-containing film is produced upon the lower surface of the cured inner liner, i.e., from drying of the rubber-containing liquid. The rubber and polyurethane components of the rubber-containing liquid, as well as any filler contained therein, will remain upon drying of the liquid or in other words will be present in the rubber-containing film. Accordingly, the above discussion of conjugated diene monomer-containing rubbers, polyurethane and filler (i.e., in the section entitled "Rubber-Containing Liquid") should be understood to apply equally to the composition of the rubber-containing film as if fully set forth herein. As also discussed above, according to first-fourth embodiments, the lower surface of the inner liner includes a rubber-containing film. The thickness of this rubber-containing film may vary. According to the fourth embodiment and certain embodiments of the first-third embodiments, the rubber-containing film has a thickness of about 0.1 to about 25 micrometers (e.g., 0.1 micrometer, 0.5 micrometers, 1 micrometer, 2 micrometers, 5 micrometers, 10 micrometers, 15 micrometers, 20 micrometers or 25 micrometers). In certain embodiments of the first-fourth embodiments, the rubber-containing film has a thickness of 0.1-15 micrometers, 0.5-15 micrometers, or 1-15 micrometers.

According to the first-fourth embodiments, the rubber-containing film is on the lower surface of the cured inner liner. According to certain embodiments of the first-fourth embodiments, the rubber-containing film that is upon the lower surface of the cured inner liner can be understood as a coating upon the lower surface of the cured inner liner. Without being bound by theory, it is believed that the rubber-containing film is physically absorbed onto the lower surface of the inner liner. In those embodiments of the first-fourth embodiments wherein the rubber-containing liquid and/or rubber-containing film comprise a cure package, the rubber-containing film may covalently bond to the rubber within the lower surface of the cured inner liner.

Adhesive Film

According to certain embodiments of the methods of the first and third embodiments, the rubber-containing film that is produced upon the lower surface of the inner liner comprises an adhesive film. Similarly, in certain embodiments of the second and fourth embodiments, the rubber-containing film upon the lower surface of the cured inner liner comprises an adhesive film. Such films can be described as adhesive, rubber-containing films or rubber-containing adhesive films. In other words, such a rubber-containing film has adhesive properties and is tacky (after drying or evaporation of solvent or solvents) at room temperature. As referred to herein, the rubber-containing film is considered to be an adhesive film when it is capable of bonding to another surface (e.g., a foam noise barrier) at room temperature; as should be clear from the above description the capability of bonding to another surface is determined after drying or evaporation of solvent or solvents. Generally, according to the methods of the first and third embodiments, an adhesive, rubber-containing film can be produced upon the lower surface of the inner liner from the rubber-containing liquid when the lower surface of the inner liner that is treated with the rubber-containing liquid has not been pre-treated with a polysiloxane-containing release treatment. Thus, in certain such embodiments, the lower surface of the inner liner that is treated with the rubber-containing liquid is essentially free of polysiloxane moieties, as discussed above, resulting in an adhesive, rubber-containing film when the solvent of the rubber-containing liquid dries or evaporates. In certain embodiments of the second and fourth embodiments wherein the rubber-containing film upon the lower surface of the inner liner comprises an adhesive film, the lower surface of the inner liner (i.e., the rubber layer underlying the rubber-containing film) is essentially free of polysiloxane moieties, as discussed above. In those embodiments of the first-fourth embodiments wherein the rubber-containing film comprises an adhesive film and at least one component radially inward of the cured inner liner is adhered to the rubber-containing film it is preferable to position the at least one component upon the adhesive rubber-containing film before the solvent(s) have completely evaporated or been otherwise removed from the liquid.

Adhesion Film

According to certain embodiments of the methods of the first and third embodiments, the rubber-containing film that is produced upon the lower surface of the inner liner comprises a non-adhesive film. Similarly, in certain embodiments of the second and fourth embodiments, the rubber-containing film upon the lower surface of the cured inner liner comprises a non-adhesive film. A non-adhesive film is generally non-sticky to the touch (at room temperature). In certain embodiments of the first-fourth embodiments, a rubber-containing film that is non-adhesive may also be considered to be an adhesion film which increases the adherability of the lower surface of the cured inner liner. By adherability is meant the ability of other materials to adhere to the lower surface of the cured inner liner. Preferably, the non-adhesive film or adhesion film is capable of having a separate adhesive (e.g., a PSA) adhered to it. Notably, when the lower surface of the cured inner liner comprises a release treatment comprising polysiloxane moieties, prior to treatment with the rubber-containing liquid, the lower surface is not capable of having a separate adhesive (e.g., a PSA) adhere to it. Thus, the rubber-containing film produced by the methods of the first and third embodiments disclosed herein as well as the rubber-containing film according to the second and fourth embodiments can be understood as improving the adherability of the lower surface of the cured inner liner particularly when the lower surface of the inner liner that is treated with the rubber-containing film comprises a release treatment comprising polysiloxane moieties.

Treating the Lower Surface

As discussed above, according to the methods of the first and third embodiments disclosed herein, the lower surface of the cured inner liner is treated with the rubber-containing liquid. The lower surface of the cured inner liner is the surface that will be positioned radially inward facing within a tire. According to the methods of the first and third embodiments, the treating may comprise various methods of applying the rubber-containing liquid to the lower surface of the cured inner liner. In certain embodiments of the first and third embodiments, the treating comprises at least one of: spraying, rolling, painting, dipping, or pouring the rubber-containing liquid onto the lower surface of the cured inner liner. The painting may comprise use of a brush or a foam applicator.

Separate Adhesive

As mentioned above, in certain embodiments of the third and fourth embodiments, the at least one radially inward component is adhered to the rubber-containing film upon the lower surface of the inner liner. In certain embodiments of the third and fourth embodiments, a separate adhesive is used to adhere the at least one radially inward component to the rubber-containing film of the lower surface of the inner liner. In certain embodiments of the third and fourth embodiments, the at least one radially inward component comprises a noise barrier (e.g., a foam noise barrier) and a separate adhesive is used to adhere the noise barrier to the rubber-containing film of the lower surface of the inner liner.

In certain embodiments of the third and fourth embodiments, the separate adhesive comprises a pressure sensitive adhesive (PSA); the pressure sensitive adhesive may be applied in various forms such as by coating (e.g., by dipping, rolling on, pressing on), extruding on, or by use of a PSA tape. Various materials may be used for the adhesive to adhere the noise barrier (or foam noise barrier) to the radially inner surface of the tire, and suitable adhesives, including suitable pressure sensitive adhesives, are known and commercially available. Generally, the adhesive should be compatible with the materials of the tire (e.g., the component to whose radially inner surface the noise barrier or foam noise barrier is adhered). In certain embodiments of the third and fourth embodiments, the separate adhesive comprises at least one of the following: (1) rubber (e.g., natural rubber, butyl rubber, halobutyl rubber, polybutadiene rubber, styrene-butadiene rubber, or a combination thereof), (2) acrylic polymer (e.g., an acrylate made by copolymerizing one or more acrylic ester with one or more other monomers or one of those discussed above), (3) silicone rubber, (4) polyether adhesive, (5) polyurethane polymer; in certain such embodiments, the separate adhesive is a PSA.

Cured Tire

As discussed above, the third embodiment disclosed herein is directed to a method for producing a tire comprising a cured inner liner and at least one component positioned radially inward of the cured inner liner. It should be understood that the tire of the third embodiment is a cured tire, e.g., having been cured in a tire press. In certain embodiments of the third embodiment, the tire can be understood as also including a tire body. As also discussed above, the fourth embodiment disclosed herein is directed to a cured tire comprising a tire body, a cured inner liner, and at least one component positioned radially inward of the cured inner liner. In certain embodiments of the fourth embodiment, the cured tire can be understood as resulting from a method according to the third embodiment.

In certain embodiments of the third and fourth embodiments, the tire or cured tire further comprises at least one of: a tread, one or more body plies, a cap ply, or a sidewall. In certain embodiments of the third and fourth embodiments, the cured tire is a pneumatic tire. Generally, within a tire, a body ply is positioned radially inward of the tread and radially outward of the inner liner and comprises a layer comprising rubber-covered textile cords. In a tire comprising a pair of annular beads, the body ply is wrapped circumferentially around the tire and extends from bead to bead, in certain embodiments extending around the beads. In certain embodiments of the third and fourth embodiments, the tire comprises a body ply positioned radially outward of the inner liner; in certain such embodiments the body ply is adjacent to the inner liner with no intervening layer(s) between and in other such embodiments the body ply is separated from the inner liner by one or more intervening layers. In certain instances, the body ply is termed a carcass ply. A carcass ply is positioned radially inward of the tire tread and radially outward of the inner liner and also comprises a layer comprising rubber-covered textile cords; in certain tires of the third and fourth embodiments, one or more carcass plies are utilized and are positioned such that they extend from bead to bead in the tire with their respective cords positioned radially or diagonally (i.e., not circumferentially). When more than one carcass ply is utilized, each may be positioned such that their cord direction differs (e.g., biased to each other). Generally, within a tire, a cap ply is a layer that is positioned radially inward of the tread and radially outward of the inner liner, and also comprises rubber-covered textile cords. In certain embodiments of the third and fourth embodiments, the tire or cured tire comprises at least one belt ply positioned radially outward of a body ply and a cap ply positioned radially outward and circumferentially over all of a portion of the axial width of the belt ply or plies.

Radially Inward Component

As discussed above, the third and fourth embodiments disclosed herein include at least one component radially inward of the inner liner and the particular at least one component may vary. In certain embodiments of the third and fourth embodiments, the at least one component comprises: a noise barrier, an air barrier layer, a sealant layer, a run-flat insert, an electronic communication module, or a combination thereof. In certain embodiments of the third and fourth embodiments disclosed herein, the at least one component radially inward of the inner liner directly contacts the film-containing lower surface of the cured inner liner. In other words, no separate adhesive or other material is located between the at least one component and the rubber-containing film upon the lower surface of the cured inner liner. Generally, the at least one component may directly contact the film-containing lower surface of the cured inner liner when the film (i.e., the rubber-containing film) comprises an adhesive film. In other embodiments of the third and fourth embodiments disclosed herein, the at least one component radially inward of the inner liner does not directly contact the film-containing lower surface of the cured inner liner. In other words, a separate adhesive or other material is located between the at least one component and the rubber-containing film upon the lower surface of the cured inner liner. Generally, the at least one component may not directly contact the film-containing lower surface of the cured inner liner when the film (i.e., the rubber-containing film) comprises a non-adhesive film (e.g., an adhesion film).

In certain embodiments of the third and fourth embodiments, the at least one component comprises a noise barrier; in certain such embodiments, the noise barrier comprises a foam noise barrier. The noise barrier or foam noise barrier (when present) may be made from various materials. Generally, a light-weight and low-density flexible material such as foamed rubber, foamed synthetic resin, or cellular plastic will be utilized for a foam noise barrier. According to the third and fourth embodiments, the foam noise barrier (when present) may comprise a foamed material (or spongy materials) that is either an open-cell type or a closed-cell type, although open-cell types are preferred. As non-limiting examples, the material of the foam noise barrier (when present) may comprise a synthetic resin foam such as ether based polyurethane foam, ester based polyurethane foam, polyethylene foam and the like; rubber foam such as chloroprene rubber foam, ethylene-propylene rubber foam, nitrile rubber foam, silicone rubber foam, or a combination thereof. In certain embodiments of the third and fourth embodiments, the foam noise barrier (when present) comprises polyethylene foam, polyurethane foam, or a combination thereof. When a separate adhesive is used to adhere the noise barrier (or foam noise barrier), that adhesive may be applied to the noise barrier (or foam noise barrier), to the radially inner surface of the tire (i.e., the rubber-containing film upon the lower surface of the inner liner) to which the foam barrier (or foam noise barrier) will be adhered, or to both.

In certain embodiments of the third and fourth embodiments, the at least one component radially inner of the inner liner comprises a sealant layer, preferably without any adhesive layer between the sealant layer and the lower surface of the inner liner (i.e., the sealant layer directly contacts the rubber-film containing lower surface of the inner liner). In certain embodiments of the third and fourth embodiments, the sealant is applied to the tire inner liner and functions to seal a puncture (e.g., from a nail) and prevent air from leaking from the tire (or at least slow the air leakage) after the puncture.

In certain embodiments of the third and fourth embodiments, the at least one component radially inner of the inner liner comprises an air barrier layer, preferably without any adhesive layer between the air barrier layer and the lower surface of the inner liner (i.e., the air barrier directly contacts the lower surface of the inner liner). In certain embodiments, the air barrier layer is applied as a spray-on material and functions to enhance the air impermeability of the inner liner, thereby better retaining air within a pneumatic tire.

In certain embodiments of the third and fourth embodiments, the at least one component radially inner of the inner liner comprises a run-flat insert. In certain such embodiments, the run-flat insert comprises a self-supporting run-flat insert such as may be used in the sidewall of a tire to produce a run-flat tire or self-supporting run-flat tire. A run-flat insert that is used in the sidewall of a tire may be positioned either axially inward or axially outward of the body ply. In certain embodiments of the third and fourth embodiments, the run-flat insert will comprise the radially innermost (or axially innermost) component in the sidewall portion of the tire; in certain such embodiments, the inner liner will comprise the radially innermost component in the remaining portion of the tire.

In certain embodiments of the third and fourth embodiments, the at least one component radially inner of the inner liner comprises an electronic communication module. In certain embodiments of the third and fourth embodiments, the electronic communication module comprises a radio device; in certain such embodiments, at least a portion of the outer surface of the radio device is surrounded by a rubber coating. As used herein, the term radio device should be understood to include any suitable radio device known in the art capable of storing information (i.e., data), communicating information, or both storing and communicating information with another device. In certain embodiments of the third and fourth embodiments, the radio device disclosed herein is capable of conveying information. The conveying of information by the radio device comprises the receipt of a radio signal combined with transponding (by reflecting) a portion of the received radio signal back to a reader with a signal modulated by varying the radio device's antenna impedance. Generally, such a radio device which conveys information by transponding in response to being activated by energy (e.g., electromagnetic waves) sent by an external, remote transponder (e.g., an interrogator-type or reader-type of transponder) is considered a passive device. In certain embodiments, the radio device disclosed herein is capable of actively transmitting information; such a radio device is an active device because it can actively transmit information. Certain such active devices transmit without the need for any activation by an external, remote transponder (e.g., at periodic intervals) and other such active devices actively transmit information in response to an appropriate activation received from an external, remote transponder. In certain embodiments of the third and fourth embodiments disclosed herein, the radio device conveys or transmits information via electromagnetic radio waves having a frequency in the range that is allowable according to local regulations. For example, in the United States, this frequency generally ranges from about 900 MHz to about 930 MHz (including 900 MHz to 930 MHz) (the current approved range being 902-928 MHz at a power level not to exceed 36 dbm) and in portions of Europe and Asia may be at a somewhat lower frequency of about 860 MHz (including 860 Mz) (the current approved range in portions of Europe is 865.6-867.6 MHz at a power level not to exceed 33 dBm). Generally, the radio devices discussed herein will be designed to convey or transmit information at a frequency ranging from about 860 MHz to about 960 MHz (including 860 MHz to 960 MHz). However, in certain embodiments of the third and fourth embodiments disclosed herein, the radio devices discussed herein may be designed to convey or transmit information at another frequency range. Examples of suitable radio devices for use with the electronic communication modules disclosed herein include transponders (e.g., devices that both receive information and transpond at least a portion of it), transmitters, receivers, and reflectors. Generally, the radio device is configured to convey or transmit information to/from an external, remote communication device, which itself may be a transponder, transmitter, receiver, or reflector depending on the functionality of the radio device of the electronic communication module of the third and fourth embodiments that it is communicating with (e.g., if the remote communication device is a transmitter, the electronic communication module's radio device is a transponder, receiver, or reflector capable of interacting with the electromagnetic waves sent from the transmitter). As used herein, the term "radio device" is inclusive of any and all of the components necessary to operate as a transponder, transmitter, receiver, or reflector, e.g., a circuit board, memory, antenna, etc.

In certain embodiments of the first-fourth embodiments, the rubber-containing film which is created or present upon the treated lower surface of the cured inner liner results in the ability to adhere at least one component (e.g., a foam noise barrier) to the inner liner. As discussed elsewhere herein, the adhering of the at least one component may be achieved using an adhesive such as a pressure-sensitive adhesive or a pressure-sensitive adhesive tape. In certain embodiments of the first-fourth embodiments, component is adhered to the inner liner via the rubber-containing film with sufficient adhesion to exhibit a peel strength of about 1 to about 30 N/mm (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 N/mm), about 1 to about 29 N/mm, about 1 to about 28 N/mm, about 1 to about 27 N/mm, about 1 to about 26 N/mm, about 1 to about 25 N/mm, about 1 to about 24 N/mm, about 1 to about 23 N/mm, about 1 to about 22 N/mm, about 1 to about 21 N/mm, about 1 to about 20 N/mm, about 1 to about 19 N/mm, about 1 to about 18 N/mm, about 1 to about 17 N/mm, about 1 to about 16 N/mm, about 1 to about 15 N/mm, about 1 to about 14 N/mm, about 1 to about 13 N/mm, about 1 to about 12 N/mm, about 1 to about 11 N/mm, about 1 to about 10 N/mm, about 1 to about 9 N/mm, about 1 to about 8 N/mm, about 1 to about 7 N/mm, about 1 to about 6 N/mm, about 1 to about 5 N/mm, about 1 to about 4 N/mm, about 1 to about 3 N/mm, about 1 to about 2 N/mm, about 2 to about 29 N/mm, about 2 to about 28 N/mm, about 2 to about 27 N/mm, about 2 to about 26 N/mm, about 2 to about 25 N/mm, about 2 to about 24 N/mm, about 2 to about 23 N/mm, about 2 to about 22 N/mm, about 2 to about 21 N/mm, about 2 to about 20 N/mm, about 2 to about 19 N/mm, about 2 to about 18 N/mm, about 2 to about 17 N/mm, about 2 to about 16 N/mm, about 2 to about 15 N/mm, about 2 to about 14 N/mm, about 2 to about 13 N/mm, about 2 to about 12 N/mm, about 2 to about 11 N/mm, about 2 to about 10 N/mm, about 2 to about 9 N/mm, about 2 to about 8 N/mm, about 2 to about 7 N/mm, about 2 to about 6 N/mm, about 2 to about 5 N/mm, about 2 to about 4 N/mm, about 2 to about 3 N/mm, about 3 to about 30 N/mm, about 3 to about 29 N/mm, about 3 to about 28 N/mm, about 3 to about 27 N/mm, about 3 to about 26 N/mm, about 3 to about 25 N/mm, about 3 to about 24 N/mm, about 3 to about 23 N/mm, about 3 to about 22 N/mm, about 3 to about 21 N/mm, about 3 to about 20 N/mm, about 3 to about 19 N/mm, about 3 to about 18 N/mm, about 3 to about 17 N/mm, about 3 to about 16 N/mm, about 3 to about 15 N/mm, about 3 to about 14 N/mm, about 3 to about 13 N/mm, about 3 to about 12 N/mm, about 3 to about 11 N/mm, about 3 to about 10 N/mm, about 3 to about 9 N/mm, about 3 to about 8 N/mm, about 3 to about 7 N/mm, about 3 to about 6 N/mm, about 3 to about 5 N/mm, about 3 to about 4 N/mm, about 4 to about 30 N/mm, about 4 to about 29 N/mm, about 4 to about 28 N/mm, about 4 to about 27 N/mm, about 4 to about 26 N/mm, about 4 to about 25 N/mm, about 4 to about 24 N/mm, about 4 to about 23 N/mm, about 4 to about 22 N/mm, about 4 to about 21 N/mm, about 4 to about 20 N/mm, about 4 to about 19 N/mm, about 4 to about 18

N/mm, about 4 to about 17 N/mm, about 4 to about 16 N/mm, about 4 to about 15 N/mm, about 4 to about 14 N/mm, about 4 to about 13 N/mm, about 4 to about 12 N/mm, about 4 to about 11 N/mm, about 4 to about 10 N/mm, about 4 to about 9 N/mm, about 4 to about 8 N/mm, about 4 to about 7 N/mm, about 4 to about 6 N/mm, about 4 to about 5 N/mm, about 5 to about 30 N/mm, about 5 to about 29 N/mm, about 5 to about 28 N/mm, about 5 to about 27 N/mm, about 5 to about 26 N/mm, about 5 to about 25 N/mm, about 5 to about 24 N/mm, about 5 to about 23 N/mm, about 5 to about 22 N/mm, about 5 to about 21 N/mm, about 5 to about 20 N/mm, about 5 to about 19 N/mm, about 5 to about 18 N/mm, about 5 to about 17 N/mm, about 5 to about 16 N/mm, about 5 to about 15 N/mm, about 5 to about 14 N/mm, about 5 to about 13 N/mm, about 5 to about 12 N/mm, about 5 to about 11 N/mm, about 5 to about 10 N/mm, about 5 to about 9 N/mm, about 5 to about 8 N/mm, about 5 to about 7 N/mm, about 5 to about 6 N/mm, about 6 to about 30 N/mm, about 6 to about 29 N/mm, about 6 to about 28 N/mm, about 6 to about 27 N/mm, about 6 to about 26 N/mm, about 6 to about 25 N/mm, about 6 to about 24 N/mm, about 6 to about 23 N/mm, about 6 to about 22 N/mm, about 6 to about 21 N/mm, about 6 to about 20 N/mm, about 6 to about 19 N/mm, about 6 to about 18 N/mm, about 6 to about 17 N/mm, about 6 to about 16 N/mm, about 6 to about 15 N/mm, about 6 to about 14 N/mm, about 6 to about 13 N/mm, about 6 to about 12 N/mm, about 6 to about 11 N/mm, about 6 to about 10 N/mm, about 6 to about 9 N/mm, about 6 to about 8 N/mm, about 6 to about 7 N/mm, about 7 to about 30 N/mm, about 7 to about 29 N/mm, about 7 to about 28 N/mm, about 7 to about 27 N/mm, about 7 to about 26 N/mm, about 7 to about 25 N/mm, about 7 to about 24 N/mm, about 7 to about 23 N/mm, about 7 to about 22 N/mm, about 7 to about 21 N/mm, about 7 to about 20 N/mm, about 7 to about 19 N/mm, about 7 to about 18 N/mm, about 7 to about 17 N/mm, about 7 to about 16 N/mm, about 7 to about 15 N/mm, about 7 to about 14 N/mm, about 7 to about 13 N/mm, about 7 to about 12 N/mm, about 7 to about 11 N/mm, about 7 to about 10 N/mm, about 7 to about 9 N/mm, about 7 to about 8 N/mm, about 8 to about 30 N/mm, about 8 to about 29 N/mm, about 8 to about 28 N/mm, about 8 to about 27 N/mm, about 8 to about 26 N/mm, about 8 to about 25 N/mm, about 8 to about 24 N/mm, about 8 to about 23 N/mm, about 8 to about 22 N/mm, about 8 to about 21 N/mm, about 8 to about 20 N/mm, about 8 to about 19 N/mm, about 8 to about 18 N/mm, about 8 to about 17 N/mm, about 8 to about 16 N/mm, about 8 to about 15 N/mm, about 8 to about 14 N/mm, about 8 to about 13 N/mm, about 8 to about 12 N/mm, about 8 to about 11 N/mm, about 8 to about 10 N/mm, about 8 to about 9 N/mm, about 9 to about 30 N/mm, about 9 to about 29 N/mm, about 9 to about 28 N/mm, about 9 to about 27 N/mm, about 9 to about 26 N/mm, about 9 to about 25 N/mm, about 9 to about 24 N/mm, about 9 to about 23 N/mm, about 9 to about 22 N/mm, about 9 to about 21 N/mm, about 9 to about 20 N/mm, about 9 to about 19 N/mm, about 9 to about 18 N/mm, about 9 to about 17 N/mm, about 9 to about 16 N/mm, about 9 to about 15 N/mm, about 9 to about 14 N/mm, about 9 to about 13 N/mm, about 9 to about 12 N/mm, about 9 to about 11 N/mm, about 9 to about 10 N/mm, about 10 to about 30 N/mm, about 10 to about 29 N/mm, about 10 to about 28 N/mm, about 10 to about 27 N/mm, about 10 to about 26 N/mm, about 10 to about 25 N/mm, about 10 to about 24 N/mm, about 10 to about 23 N/mm, about 10 to about 22 N/mm, about 10 to about 21 N/mm, about 10 to about 20 N/mm, about 10 to about 19 N/mm, about 10 to about 18 N/mm, about 10 to about 17 N/mm, about 10 to about 16 N/mm, about 10 to about 15 N/mm, about 10 to about 14 N/mm, about 10 to about 13 N/mm, about 10 to about 12 N/mm, about 10 to about 11 N/mm, about 11 to about 30 N/mm, about 11 to about 29 N/mm, about 11 to about 28 N/mm, about 11 to about 27 N/mm, about 11 to about 26 N/mm, about 11 to about 25 N/mm, about 11 to about 24 N/mm, about 11 to about 23 N/mm, about 11 to about 22 N/mm, about 11 to about 21 N/mm, about 11 to about 20 N/mm, about 11 to about 19 N/mm, about 11 to about 18 N/mm, about 11 to about 17 N/mm, about 11 to about 16 N/mm, about 11 to about 15 N/mm, about 11 to about 14 N/mm, about 11 to about 13 N/mm, about 11 to about 12 N/mm, about 12 to about 30 N/mm, about 12 to about 29 N/mm, about 12 to about 28 N/mm, about 12 to about 27 N/mm, about 12 to about 26 N/mm, about 12 to about 25 N/mm, about 12 to about 24 N/mm, about 12 to about 23 N/mm, about 12 to about 22 N/mm, about 12 to about 21 N/mm, about 12 to about 20 N/mm, about 12 to about 19 N/mm, about 12 to about 18 N/mm, about 12 to about 17 N/mm, about 12 to about 16 N/mm, about 12 to about 15 N/mm, about 12 to about 14 N/mm, about 12 to about 13 N/mm, about 13 to about 30 N/mm, about 13 to about 29 N/mm, about 13 to about 28 N/mm, about 13 to about 27 N/mm, about 13 to about 26 N/mm, about 13 to about 25 N/mm, about 13 to about 24 N/mm, about 13 to about 23 N/mm, about 13 to about 22 N/mm, about 13 to about 21 N/mm, about 13 to about 20 N/mm, about 13 to about 19 N/mm, about 13 to about 18 N/mm, about 13 to about 17 N/mm, about 13 to about 16 N/mm, about 13 to about 15 N/mm, about 13 to about 14 N/mm, about 14 to about 30 N/mm, about 14 to about 29 N/mm, about 14 to about 28 N/mm, about 14 to about 27 N/mm, about 14 to about 26 N/mm, about 14 to about 25 N/mm, about 14 to about 24 N/mm, about 14 to about 23 N/mm, about 14 to about 22 N/mm, about 14 to about 21 N/mm, about 14 to about 20 N/mm, about 14 to about 19 N/mm, about 14 to about 18 N/mm, about 14 to about 17 N/mm, about 14 to about 16 N/mm, about 14 to about 15 N/mm, about 15 to about 30 N/mm, about 15 to about 29 N/mm, about 15 to about 28 N/mm, about 15 to about 27 N/mm, about 15 to about 26 N/mm, about 15 to about 25 N/mm, about 15 to about 24 N/mm, about 15 to about 23 N/mm, about 15 to about 22 N/mm, about 15 to about 21 N/mm, about 15 to about 20 N/mm, about 15 to about 19 N/mm, about 15 to about 18 N/mm, about 15 to about 17 N/mm, about 15 to about 16 N/mm, about 16 to about 30 N/mm, about 16 to about 29 N/mm, about 16 to about 28 N/mm, about 16 to about 27 N/mm, about 16 to about 26 N/mm, about 16 to about 25 N/mm, about 16 to about 24 N/mm, about 16 to about 23 N/mm, about 16 to about 22 N/mm, about 16 to about 21 N/mm, about 16 to about 20 N/mm, about 16 to about 19 N/mm, about 16 to about 18 N/mm, about 16 to about 17 N/mm, about 17 to about 30 N/mm, about 17 to about 29 N/mm, about 17 to about 28 N/mm, about 17 to about 27 N/mm, about 17 to about 26 N/mm, about 17 to about 25 N/mm, about 17 to about 24 N/mm, about 17 to about 23 N/mm, about 17 to about 22 N/mm, about 17 to about 21 N/mm, about 17 to about 20 N/mm, about 17 to about 19 N/mm, about 17 to about 18 N/mm, about 18 to about 30 N/mm, about 18 to about 29 N/mm, about 18 to about 28 N/mm, about 18 to about 27 N/mm, about 18 to about 26 N/mm, about 18 to about 25 N/mm, about 18 to about 24 N/mm, about 18 to about 23 N/mm, about 18 to about 22 N/mm, about 18 to about 21 N/mm, about 18 to about 20 N/mm, about 18 to about 19 N/mm, about 19 to about 30

N/mm, about 19 to about 29 N/mm, about 19 to about 28 N/mm, about 19 to about 27 N/mm, about 19 to about 26 N/mm, about 19 to about 25 N/mm, about 19 to about 24 N/mm, about 19 to about 23 N/mm, about 19 to about 22 N/mm, about 19 to about 21 N/mm, about 19 to about 20 N/mm, about 20 to about 30 N/mm, about 20 to about 29 N/mm, about 20 to about 28 N/mm, about 20 to about 27 N/mm, about 20 to about 26 N/mm, about 20 to about 25 N/mm, about 20 to about 24 N/mm, about 20 to about 23 N/mm, about 20 to about 22 N/mm, about 20 to about 21 N/mm, about 21 to about 30 N/mm, about 21 to about 29 N/mm, about 21 to about 28 N/mm, about 21 to about 27 N/mm, about 21 to about 26 N/mm, about 21 to about 25 N/mm, about 21 to about 24 N/mm, about 21 to about 23 N/mm, about 21 to about 22 N/mm, about 22 to about 30 N/mm, about 22 to about 29 N/mm, about 22 to about 28 N/mm, about 22 to about 27 N/mm, about 22 to about 26 N/mm, about 22 to about 25 N/mm, about 22 to about 24 N/mm, about 22 to about 23 N/mm, about 23 to about 30 N/mm, about 23 to about 29 N/mm, about 23 to about 28 N/mm, about 23 to about 27 N/mm, about 23 to about 26 N/mm, about 23 to about 25 N/mm, about 23 to about 24 N/mm, about 24 to about 30 N/mm, about 24 to about 29 N/mm, about 24 to about 28 N/mm, about 24 to about 27 N/mm, about 24 to about 26 N/mm, about 24 to about 25 N/mm, about 25 to about 30 N/mm, about 25 to about 29 N/mm, about 25 to about 28 N/mm, about 25 to about 27 N/mm, about 25 to about 26 N/mm, about 26 to about 30 N/mm, about 26 to about 29 N/mm, about 26 to about 28 N/mm, about 26 to about 27 N/mm, about 27 to about 30 N/mm, about 27 to about 29 N/mm, about 27 to about 28 N/mm, about 28 to about 30 N/mm, about 28 to about 29 N/mm, about 29 to about 30 N/mm. In certain embodiments of the first-fourth embodiments, component is adhered to the inner liner via the rubber-containing film with sufficient adhesion to exhibit a peel strength of 1 to 30 N/mm (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 N/mm), 1 to 29 N/mm, 1 to 28 N/mm, 1 to 27 N/mm, 1 to 26 N/mm, 1 to 25 N/mm, 1 to 24 N/mm, 1 to 23 N/mm, 1 to 22 N/mm, 1 to 21 N/mm, 1 to 20 N/mm, 1 to 19 N/mm, 1 to 18 N/mm, 1 to 17 N/mm, 1 to 16 N/mm, 1 to 15 N/mm, 1 to 14 N/mm, 1 to 13 N/mm, 1 to 12 N/mm, 1 to 11 N/mm, 1 to 10 N/mm, 1 to 9 N/mm, 1 to 8 N/mm, 1 to 7 N/mm, 1 to 6 N/mm, 1 to 5 N/mm, 1 to 4 N/mm, 1 to 3 N/mm, 1 to 2 N/mm, 2 to 29 N/mm, 2 to 28 N/mm, 2 to 27 N/mm, 2 to 26 N/mm, 2 to 25 N/mm, 2 to 24 N/mm, 2 to 23 N/mm, 2 to 22 N/mm, 2 to 21 N/mm, 2 to 20 N/mm, 2 to 19 N/mm, 2 to 18 N/mm, 2 to 17 N/mm, 2 to 16 N/mm, 2 to 15 N/mm, 2 to 14 N/mm, 2 to 13 N/mm, 2 to 12 N/mm, 2 to 11 N/mm, 2 to 10 N/mm, 2 to 9 N/mm, 2 to 8 N/mm, 2 to 7 N/mm, 2 to 6 N/mm, 2 to 5 N/mm, 2 to 4 N/mm, 2 to 3 N/mm, 3 to 30 N/mm, 3 to 29 N/mm, 3 to 28 N/mm, 3 to 27 N/mm, 3 to 26 N/mm, 3 to 25 N/mm, 3 to 24 N/mm, 3 to 23 N/mm, 3 to 22 N/mm, 3 to 21 N/mm, 3 to 20 N/mm, 3 to 19 N/mm, 3 to 18 N/mm, 3 to 17 N/mm, 3 to 16 N/mm, 3 to 15 N/mm, 3 to 14 N/mm, 3 to 13 N/mm, 3 to 12 N/mm, 3 to 11 N/mm, 3 to 10 N/mm, 3 to 9 N/mm, 3 to 8 N/mm, 3 to 7 N/mm, 3 to 6 N/mm, 3 to 5 N/mm, 3 to 4 N/mm, 4 to 30 N/mm, 4 to 29 N/mm, 4 to 28 N/mm, 4 to 27 N/mm, 4 to 26 N/mm, 4 to 25 N/mm, 4 to 24 N/mm, 4 to 23 N/mm, 4 to 22 N/mm, 4 to 21 N/mm, 4 to 20 N/mm, 4 to 19 N/mm, 4 to 18 N/mm, 4 to 17 N/mm, 4 to 16 N/mm, 4 to 15 N/mm, 4 to 14 N/mm, 4 to 13 N/mm, 4 to 12 N/mm, 4 to 11 N/mm, 4 to 10 N/mm, 4 to 9 N/mm, 4 to 8 N/mm, 4 to 7 N/mm, 4 to 6 N/mm, 4 to 5 N/mm, 5 to 30 N/mm, 5 to 29 N/mm, 5 to 28 N/mm, 5 to 27 N/mm, 5 to 26 N/mm, 5 to 25 N/mm, 5 to 24 N/mm, 5 to 23 N/mm, 5 to 22 N/mm, 5 to 21 N/mm, 5 to 20 N/mm, 5 to 19 N/mm, 5 to 18 N/mm, 5 to 17 N/mm, 5 to 16 N/mm, 5 to 15 N/mm, 5 to 14 N/mm, 5 to 13 N/mm, 5 to 12 N/mm, 5 to 11 N/mm, 5 to 10 N/mm, 5 to 9 N/mm, 5 to 8 N/mm, 5 to 7 N/mm, 5 to 6 N/mm, 6 to 30 N/mm, 6 to 29 N/mm, 6 to 28 N/mm, 6 to 27 N/mm, 6 to 26 N/mm, 6 to 25 N/mm, 6 to 24 N/mm, 6 to 23 N/mm, 6 to 22 N/mm, 6 to 21 N/mm, 6 to 20 N/mm, 6 to 19 N/mm, 6 to 18 N/mm, 6 to 17 N/mm, 6 to 16 N/mm, 6 to 15 N/mm, 6 to 14 N/mm, 6 to 13 N/mm, 6 to 12 N/mm, 6 to 11 N/mm, 6 to 10 N/mm, 6 to 9 N/mm, 6 to 8 N/mm, 6 to 7 N/mm, 7 to 30 N/mm, 7 to 29 N/mm, 7 to 28 N/mm, 7 to 27 N/mm, 7 to 26 N/mm, 7 to 25 N/mm, 7 to 24 N/mm, 7 to 23 N/mm, 7 to 22 N/mm, 7 to 21 N/mm, 7 to 20 N/mm, 7 to 19 N/mm, 7 to 18 N/mm, 7 to 17 N/mm, 7 to 16 N/mm, 7 to 15 N/mm, 7 to 14 N/mm, 7 to 13 N/mm, 7 to 12 N/mm, 7 to 11 N/mm, 7 to 10 N/mm, 7 to 9 N/mm, 7 to 8 N/mm, 8 to 30 N/mm, 8 to 29 N/mm, 8 to 28 N/mm, 8 to 27 N/mm, 8 to 26 N/mm, 8 to 25 N/mm, 8 to 24 N/mm, 8 to 23 N/mm, 8 to 22 N/mm, 8 to 21 N/mm, 8 to 20 N/mm, 8 to 19 N/mm, 8 to 18 N/mm, 8 to 17 N/mm, 8 to 16 N/mm, 8 to 15 N/mm, 8 to 14 N/mm, 8 to 13 N/mm, 8 to 12 N/mm, 8 to 11 N/mm, 8 to 10 N/mm, 8 to 9 N/mm, 9 to 30 N/mm, 9 to 29 N/mm, 9 to 28 N/mm, 9 to 27 N/mm, 9 to 26 N/mm, 9 to 25 N/mm, 9 to 24 N/mm, 9 to 23 N/mm, 9 to 22 N/mm, 9 to 21 N/mm, 9 to 20 N/mm, 9 to 19 N/mm, 9 to 18 N/mm, 9 to 17 N/mm, 9 to 16 N/mm, 9 to 15 N/mm, 9 to 14 N/mm, 9 to 13 N/mm, 9 to 12 N/mm, 9 to 11 N/mm, 9 to 10 N/mm, 10 to 30 N/mm, 10 to 29 N/mm, 10 to 28 N/mm, 10 to 27 N/mm, 10 to 26 N/mm, 10 to 25 N/mm, 10 to 24 N/mm, 10 to 23 N/mm, 10 to 22 N/mm, 10 to 21 N/mm, 10 to 20 N/mm, 10 to 19 N/mm, 10 to 18 N/mm, 10 to 17 N/mm, 10 to 16 N/mm, 10 to 15 N/mm, 10 to 14 N/mm, 10 to 13 N/mm, 10 to 12 N/mm, 10 to 11 N/mm, 11 to 30 N/mm, 11 to 29 N/mm, 11 to 28 N/mm, 11 to 27 N/mm, 11 to 26 N/mm, 11 to 25 N/mm, 11 to 24 N/mm, 11 to 23 N/mm, 11 to 22 N/mm, 11 to 21 N/mm, 11 to 20 N/mm, 11 to 19 N/mm, 11 to 18 N/mm, 11 to 17 N/mm, 11 to 16 N/mm, 11 to 15 N/mm, 11 to 14 N/mm, 11 to 13 N/mm, 11 to 12 N/mm, 12 to 30 N/mm, 12 to 29 N/mm, 12 to 28 N/mm, 12 to 27 N/mm, 12 to 26 N/mm, 12 to 25 N/mm, 12 to 24 N/mm, 12 to 23 N/mm, 12 to 22 N/mm, 12 to 21 N/mm, 12 to 20 N/mm, 12 to 19 N/mm, 12 to 18 N/mm, 12 to 17 N/mm, 12 to 16 N/mm, 12 to 15 N/mm, 12 to 14 N/mm, 12 to 13 N/mm, 13 to 30 N/mm, 13 to 29 N/mm, 13 to 28 N/mm, 13 to 27 N/mm, 13 to 26 N/mm, 13 to 25 N/mm, 13 to 24 N/mm, 13 to 23 N/mm, 13 to 22 N/mm, 13 to 21 N/mm, 13 to 20 N/mm, 13 to 19 N/mm, 13 to 18 N/mm, 13 to 17 N/mm, 13 to 16 N/mm, 13 to 15 N/mm, 13 to 14 N/mm, 14 to 30 N/mm, 14 to 29 N/mm, 14 to 28 N/mm, 14 to 27 N/mm, 14 to 26 N/mm, 14 to 25 N/mm, 14 to 24 N/mm, 14 to 23 N/mm, 14 to 22 N/mm, 14 to 21 N/mm, 14 to 20 N/mm, 14 to 19 N/mm, 14 to 18 N/mm, 14 to 17 N/mm, 14 to 16 N/mm, 14 to 15 N/mm, 15 to 30 N/mm, 15 to 29 N/mm, 15 to 28 N/mm, 15 to 27 N/mm, 15 to 26 N/mm, 15 to 25 N/mm, 15 to 24 N/mm, 15 to 23 N/mm, 15 to 22 N/mm, 15 to 21 N/mm, 15 to 20 N/mm, 15 to 19 N/mm, 15 to 18 N/mm, 15 to 17 N/mm, 15 to 16 N/mm, 16 to 30 N/mm, 16 to 29 N/mm, 16 to 28 N/mm, 16 to 27 N/mm, 16 to 26 N/mm, 16 to 25 N/mm, 16 to 24 N/mm, 16 to 23 N/mm, 16 to 22 N/mm, 16 to 21 N/mm, 16 to 20 N/mm, 16 to 19 N/mm, 16 to 18 N/mm, 16 to 17 N/mm, 17 to 30 N/mm, 17 to 29 N/mm, 17 to 28 N/mm, 17 to 27 N/mm, 17 to 26 N/mm, 17 to 25 N/mm, 17 to 24 N/mm, 17 to 23 N/mm, 17 to 22 N/mm, 17 to 21 N/mm, 17 to 20 N/mm, 17 to 19 N/mm, 17 to 18 N/mm, 18 to 30 N/mm, 18 to 29 N/mm, 18 to 28 N/mm, 18 to 27 N/mm, 18 to 26 N/mm, 18 to 25 N/mm, 18 to 24 N/mm, 18 to 23 N/mm, 18 to 22 N/mm, 18 to 21 N/mm, 18 to 20 N/mm, 18 to 19 N/mm, 19 to 30 N/mm, 19 to 29 N/mm, 19 to 28 N/mm, 19 to 27 N/mm, 19 to 26 N/mm, 19 to 25 N/mm, 19 to 24 N/mm, 19 to 23 N/mm, 19 to 22 N/mm, 19 to 21 N/mm, 19 to 20 N/mm, 20 to 30 N/mm, 20 to 29 N/mm, 20 to 28 N/mm, 20 to 27 N/mm, 20 to 26 N/mm, 20 to 25 N/mm, 20 to 24 N/mm, 20 to 23 N/mm, 20 to 22 N/mm, 20 to 21 N/mm, 21 to 30 N/mm, 21 to 29 N/mm, 21 to 28 N/mm, 21 to 27 N/mm, 21 to 26 N/mm, 21 to 25 N/mm, 21 to 24 N/mm, 21 to 23 N/mm, 21 to 22 N/mm, 22 to 30 N/mm, 22 to 29 N/mm, 22 to 28 N/mm, 22 to 27 N/mm, 22 to 26 N/mm, 22 to 25 N/mm, 22 to 24 N/mm, 22 to 23 N/mm, 23 to 30 N/mm, 23 to 29 N/mm, 23 to 28 N/mm, 23 to 27 N/mm, 23 to 26 N/mm, 23 to 25 N/mm, 23 to 24 N/mm, 24 to 30 N/mm, 24 to 29 N/mm, 24 to 28 N/mm, 24 to 27 N/mm, 24 to 26 N/mm, 24 to 25 N/mm, 25 to 30 N/mm, 25 to 29 N/mm, 25 to 28 N/mm, 25 to 27 N/mm, 25 to 26 N/mm, 26 to 30 N/mm, 26 to 29 N/mm, 26 to 28 N/mm, 26 to 27 N/mm, 27 to 30 N/mm, 27 to 29 N/mm, 27 to 28 N/mm, 28 to 30 N/mm, 28 to 29 N/mm, 29 to 30 N/mm.

The foregoing peel strength numbers and ranges refer to measurements made at 23° C. The peel strength measurements can be made according to ASTM Procedure D903 and/or according to ASTM Procedure D1876 and utilizing a sample (e.g., from a tire or a partially assembled tire) containing an inner liner, a rubber-containing film, and a component such as a noise barrier adhered to the inner liner via the rubber-containing film. In certain embodiments, the foregoing peel strength numbers and ranges refer to measurements made using pressure sensitive adhesive or pressure sensitive tape to adhere the component to the inner liner via the rubber-containing film. In certain embodiments, the foregoing peel strength numbers and ranges refer to measurements made upon an inner liner which has a lower surface comprising a release treatment comprising polysiloxane moieities. In certain embodiments, the foregoing peel strength numbers and ranges refer to measurements made upon an inner liner which has a lower surface essentially free of polysiloxane moieities.

When measuring peel strength, the measurement may be made upon a sample cut from an assembled component/adhesive/rubber-containing film/inner liner combination or may be prepared especially for testing (using the same ingredients for the inner liner, adhesive and rubber-containing film. When a sample is prepared especially for testing, the sample is preferably prepared adhering the component to the inner liner via the rubber-containing film. Alternatively, a sample may be prepared for testing using the same ingredients for the inner liner, adhesive and rubber-containing film but substituting a butyl rubber sheet for the component; using the foregoing type of sample may be especially useful when the product in question is manufactured or sold in a state that does not (yet) include an adhered component such as a foam noise barrier. The foregoing peel strength numbers and ranges are intended to refer to average numbers that can be obtained by averaging the result of three or four duplicate tests. When peel strength data is obtained in a form which separates measurements for peaks and valleys, the foregoing peel strength numbers and ranges refer to an average of the average peak and average valley measurement. In certain embodiments of the first-fourth embodiments, at least one of the average peak and average valley measurement falls within one of the foregoing ranges; in certain such embodiments, both the average peak and the average valley measurements fall within one of the foregoing ranges.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for treating a cured inner liner for a tire comprising:
   a. providing a cured inner liner comprising rubber, a majority of which comprises butyl rubber (optionally halogenated), wherein the cured inner liner has an upper and a lower surface,
   b. treating the lower surface of the cured inner liner with a rubber-containing liquid wherein the rubber-containing liquid comprises at least one conjugated diene monomer-containing rubber, polyurethane and at least one solvent, and c. allowing the rubber-containing liquid to dry upon the treated surface of the cured inner liner, thereby producing a rubber-containing film upon the dried, treated surface.

2. The method of claim 1, wherein the rubber-containing film has a thickness of about 0.1 to about 25 micrometers.

3. The method of claim 1, wherein the lower surface of the cured inner liner of (a) further comprises a release treatment comprising polysiloxane moieties.

4. The method of claim 1, wherein the lower surface of the cured inner liner of (a) is essentially free of polysiloxane moieties.

5. The method of claim 4, wherein the film produced in (c) comprises an adhesive film.

6. The method of claim 1, wherein
   the rubber of the rubber-containing liquid comprises at least one of the following: butyl rubber, halogenated butyl rubber, polybutadiene, natural rubber, polyisoprene, or chlorinated polyisoprene, and
   the polyurethane is present in the rubber-containing liquid in an amount of 10-50 phr.

7. The method of claim 1, wherein the rubber-containing liquid comprises
   a. 100 parts of butyl rubber, halogenated butyl rubber, or a combination thereof, and
   b. 10-50 phr of polyurethane.

8. The method of claim 1, wherein the at least one solvent of the rubber-containing liquid meets at least one of the following:
   a. comprises a majority by weight of at least one hydrocarbon solvent; or
   b. comprises a majority by weight of at least one halogenated aromatic hydrocarbon solvent, at least one halogenated C1-C6 alkane, at least one halogenated C2-C6 alkene, or a combination thereof.

9. A method for treating a cured inner liner for a tire comprising:
   a. providing a cured inner liner comprising rubber, a majority of which comprises butyl rubber (optionally halogenated), wherein the cured inner liner has an upper and a lower surface,
   b. treating the lower surface of the cured inner liner with a rubber-containing liquid wherein the rubber-containing liquid comprises at least one conjugated diene monomer-containing rubber, polyurethane in an amount of about 10 to about 50 phr and at least one solvent, and
   c. allowing the rubber-containing liquid to dry upon the treated surface of the cured inner liner, thereby producing a rubber-containing film upon the dried, treated surface.

10. The method of claim 9, wherein the rubber-containing film has a thickness of about 0.1 to about 25 micrometers.

11. The method of claim 9, wherein the lower surface of the cured inner liner of (a) further comprises a release treatment comprising polysiloxane moieties.

12. The method of claim 9, wherein the lower surface of the cured inner liner of (a) is essentially free of polysiloxane moieties.

13. The method of claim 12, wherein the film produced in (c) comprises an adhesive film.

14. The method of claim 9, wherein the rubber of the rubber-containing liquid comprises at least one of the following: butyl rubber, halogenated butyl rubber, polybutadiene, natural rubber, polyisoprene, or chlorinated polyisoprene.

15. The method of claim 9, wherein the rubber-containing liquid comprises 100 parts of butyl rubber, halogenated butyl rubber, or a combination thereof.

16. The method of claim 9, wherein the at least one solvent of the rubber-containing liquid meets at least one of the following:
   a. comprises a majority by weight of at least one hydrocarbon solvent; or
   b. comprises a majority by weight of at least one halogenated aromatic hydrocarbon solvent, at least one halogenated C1-C6 alkane, at least one halogenated C2-C6 alkene, or a combination thereof.

* * * * *